United States Patent [19]
Tyson et al.

[11] Patent Number: 6,047,615
[45] Date of Patent: Apr. 11, 2000

[54] POSITIVE ACTING DIFFERENTIAL WITH SLOTTED SOLID SPACER AND AXLE THRUST SLUG

[75] Inventors: Mark V. Tyson, Balboa Island; Valentine Cucu, Long Beach; Peter A. Dickey, Costa Mesa, all of Calif.

[73] Assignee: Vehicular Technologies, Inc., Costa Mesa, Calif.

[21] Appl. No.: 09/311,845

[22] Filed: May 14, 1999

[51] Int. Cl.[7] .................................................. F16H 48/12
[52] U.S. Cl. ............................................. 74/650; 192/200
[58] Field of Search ............................. 74/650; 475/250, 475/252; 192/200

[56] References Cited

U.S. PATENT DOCUMENTS

| | | |
|---|---|---|
| 1,529,804 | 7/1925 | Nogrady . |
| 2,545,601 | 3/1951 | Brubaker . |
| 2,638,794 | 5/1953 | Knoblock . |
| 2,667,087 | 1/1954 | Myers . |
| 2,667,088 | 1/1954 | Myers . |
| 2,830,466 | 4/1958 | Myers . |
| 2,855,806 | 10/1958 | Fallon . |
| 3,131,578 | 5/1964 | Elliott . |
| 3,397,593 | 8/1968 | Knoblock . |
| 3,791,238 | 2/1974 | Bokovoy . |
| 4,104,931 | 8/1978 | Tomich . |
| 4,159,656 | 7/1979 | Tomich . |
| 4,424,725 | 1/1984 | Bawks . |
| 4,524,640 | 6/1985 | Neumann . |
| 4,557,158 | 12/1985 | Dissett . |
| 4,621,540 | 11/1986 | Davison . |
| 4,745,818 | 5/1988 | Edwards . |
| 5,413,015 | 5/1995 | Zentmyer . |
| 5,590,572 | 1/1997 | Valente . |
| 5,603,246 | 2/1997 | Zentmyer . |
| 5,637,049 | 6/1997 | Zentmyer . |
| 5,836,220 | 11/1998 | Valente . |
| 5,983,754 | 11/1999 | Tyson et al. ............................... 74/650 |

*Primary Examiner*—Khoi Q. Ta
*Attorney, Agent, or Firm*—Blakely, Sokoloff, Taylor & Zafman LLP

[57] ABSTRACT

Positive acting differentials of the type having toothed drivers and couplers which automatically connect the two axles together to provide optimum traction for the vehicle, yet releases one axle when the vehicle is proceeding around a curve without drive wheel slippage, whereby only a single axle is engaged through the drive system. In assemblies of the type wherein the axles are retained in the assembly by a C clip and a thrust slug, at least one driver and one spacer are slotted so as to provide space for the insertion of C clip during assembly, and a thrust slug is fitted within the spacers. This allows selection of the driver and coupler thicknesses without being restricted by the possible positions of the C clip groove in the axles during assembly, and reduces wear in the driver and coupler teeth by eliminating a source of possible cocking between the engaging drivers and couplers. Preferred and some alternate embodiments are disclosed.

27 Claims, 12 Drawing Sheets

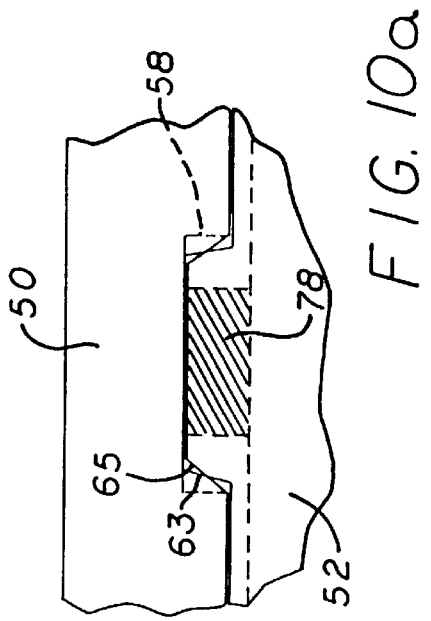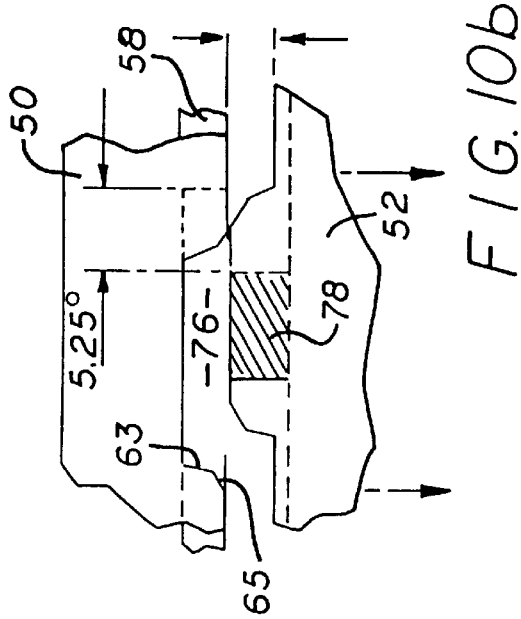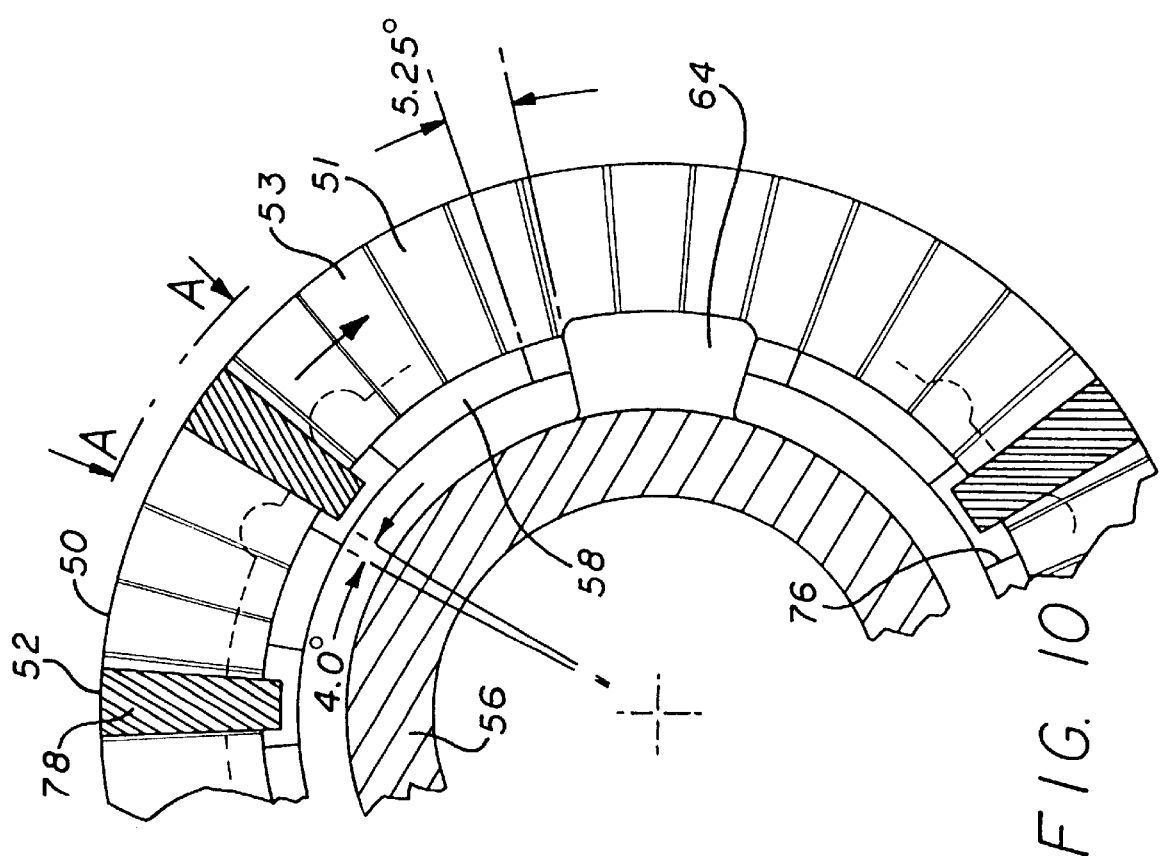

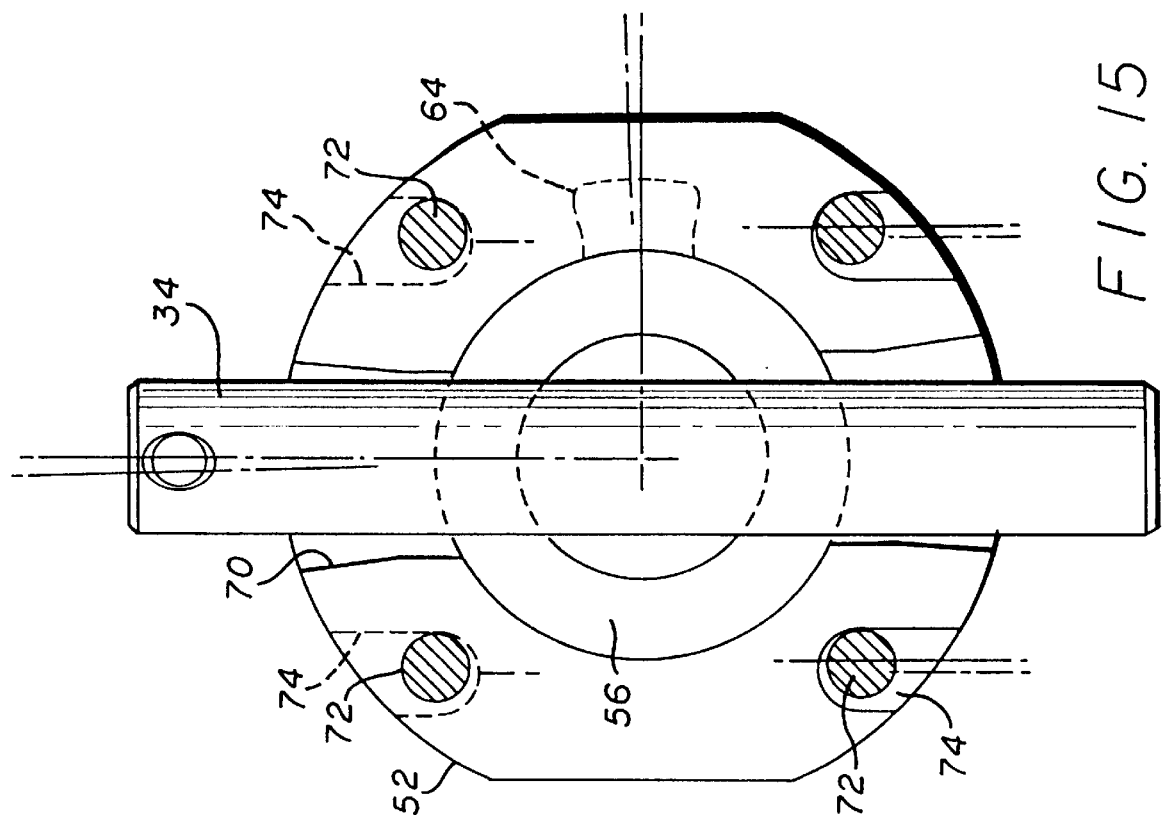
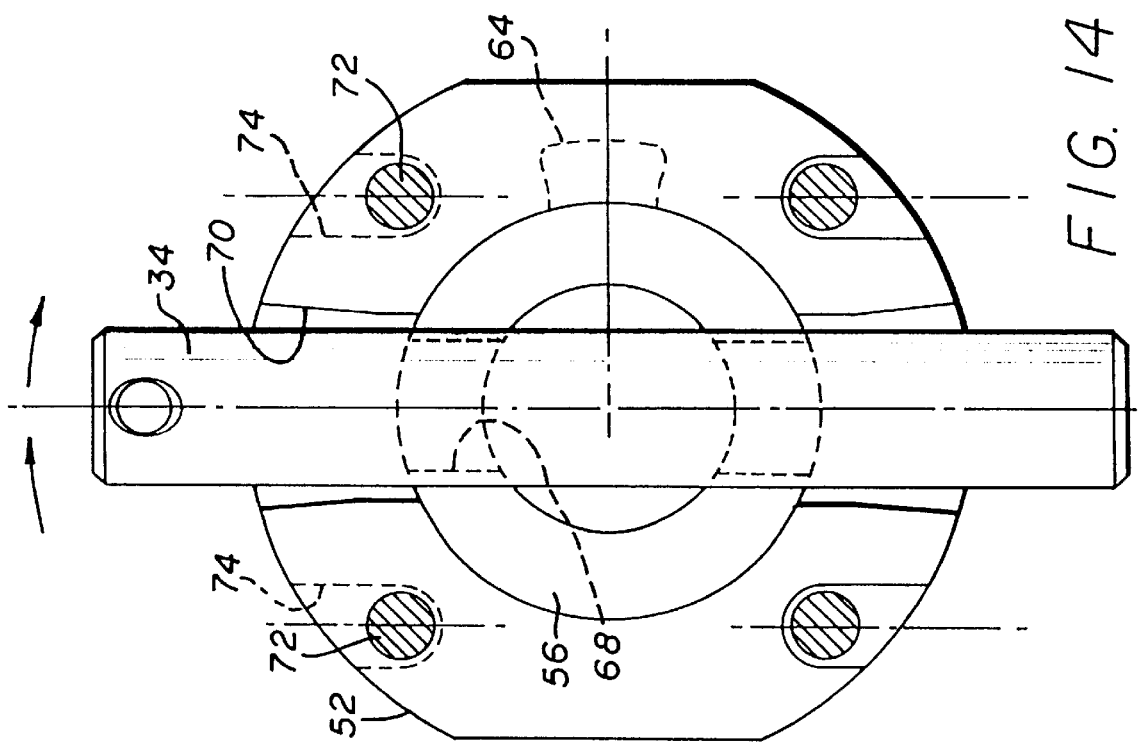

6,047,615

1

POSITIVE ACTING DIFFERENTIAL WITH SLOTTED SOLID SPACER AND AXLE THRUST SLUG

BACKGROUND OF THE INVENTION

1. Field of the Invention

The present invention relates to the field of positively acting differentials for motor vehicles.

2. Prior Art

Land vehicles, such as automobiles, trucks, buses and the like, typically utilize what has become known as an "open differential" for the final drive system. In such a differential, bevel gears are coupled to the inner ends of left and right collinear axles. These bevel gears engage accompanying bevel gears mounted on a pinion pin in a differential case. The differential case, in turn, has a ring gear thereon, with the ring gear and differential case being driven in rotation about the axis of the axles by a pinion gear on the drive shaft. The angular velocity of the ring gear and differential case determines the average angular velocity of the two axles. However, the bevel gearset within the differential case between the two axles allows one axle to turn faster and the other axle to turn slower than the ring gear and differential case at any particular time. This, of course, is highly desirable in normal driving, as it allows the axle coupled to the outer wheel to rotate faster than the axle coupled to the inner wheel when going around a curve or turning a sharp corner. It also causes the drive system to deliver the same drive torque to each of the two axles to avoid a tendency for the vehicle to pull to one side or the other when power is applied or removed. The amount of torque that can be transmitted through an open differential is limited to that able to be carried by the wheel with the least amount of traction.

There are certain situations, however, where the aforementioned characteristics of an open differential become undesirable. In particular, when one wheel loses traction, the torque which will be delivered to the wheel with traction will be no higher than the torque delivered to the wheel without traction. For instance, with one drive wheel on ice and the other drive wheel on dry concrete, the torque delivered to the drive wheel on dry concrete will be no higher than can be carried by the wheel on ice. A locking differential, however, will effectively couple the two axles together so that they turn in unison, forcing rotation of the drive wheel with greater traction along with the rotation of the wheel with lesser traction. The locking differential, as opposed to the open differential, can transmit as much torque as can be carried by the wheel with the most traction. High performance vehicles, off-road vehicles and the like may similarly take advantage of the characteristics of locking differentials to improve their traction performance.

The present invention is a significant improvement in a prior art differential manufactured by Vehicular Technologies, Inc., assignee of the present invention, and sold under the trademark "Performance." That prior art device is shown in the exploded view of FIG. 1.

Referring to FIG. 1, the splined inner end of axle 20 engages mating splines in a coupler 22, with a similar coupler 22 at the opposite side of the assembly similarly mating at the inner end of the other axle, not shown. A locking differential reuses some components of the open differential supplied with the vehicle. In particular, the pinion pin 34 that carries the bevel gears of the open differential may be reused although the bevel gears are not used. For this reason, pin 34 is referred to as a pinion pin

2 even though it does not carry gears in a locking differential of the type shown. In the version shown, the axles are retained in position by C clips 24 that establish the outward limit for the axial position of the axle.

In some original equipment open differentials, a thrust block is fitted over the pinion pin. The ends of the axle bear inwardly against the thrust block establishing an inward limit for the axial position of the axles. In prior art locking differentials for use in original equipment that employed a thrust block, the spacers 38 have a blind bore 37 with a bottom face 39 opposite the inner face 35 of the spacer. The thickness of the material between the bottom face and the inner face provides the same spacing relationship between the inner end of the axle and the pinion pin as the original equipment thrust block. The ends of the axles 20 bear against the inner face of the spacer and the spacer in turn bears against the pinion pin to establish the desired inward limit.

The couplers 22 have a plurality of teeth 26 on the face thereof which may mate with corresponding teeth on the faces 28 of drivers 30, depending upon the axial position of the drivers. The drivers 30, in turn, have saddle-shaped depressions 32 on the opposite faces thereof for loosely surrounding the pinion pin 34 driven by the differential case 54 (see FIG. 2 for the position of the pinion pin in the overall differential assembly). The drivers 30 each have springs 36 in angled blind holes in the driver, the springs acting on pin 34 to both elastically encourage the drivers to a position having the pin 34 aligned with the center of the saddle-shaped depressions, and to elastically encourage the drivers axially outward away from the pin 34 into engagement with the couplers. Pins 40 on the drivers 30 fit within slots 42 on the opposing face of the opposite driver and function to control the angular displacement of the drivers to each other.

The drivers 30 must be in close axial alignment with the couplers 22 and be free to move axially to allow engagement and disengagement from the adjacent coupler to provide the locking differential action. The outer diameters of the splined ends of the axles 20 typically do not provide a suitable locating surface for the drivers. Spacers 38 establish and retain the drivers 30 in axial alignment with the couplers 22 and provide sliding surfaces for the drivers. As may be seen in FIG. 4, each spacer is located relative to a coupler by a radial shoulder in the face of the coupler. While FIG. 4 shows the spacer aligned by a shoulder against an inside diameter of the spacer, it will be appreciated that the spacer can also be aligned by a shoulder against an outside diameter. The spacers are closely fitted between the pinion pin 34 and the adjacent coupler 22 to maintain the axial position of the spacer. However, there is sufficient clearance to allow the spacers to rotate relative to the couplers.

In the final assembly, the springs 36 encourage the toothed face of the drivers 30 into engagement with the toothed face of couplers 22, and there is sufficient clearance between the saddle-shaped depressions 32 and pin 34 in the final assembly for either driver to move toward the pin 34 sufficiently to allow the teeth of a driver 30 to ride over the teeth of the associated coupler 22.

The operation of the prior art device may be explained as follows. With the teeth of the corresponding driver and coupler pairs engaged, the differential housing may rotate, carrying pin 34 from contact with one side of the saddle to the other, a displacement of (depending on the size of the design) 4 to 7 degrees. This free travel, or backlash, is essential for correct positioning of the differential components during the transition from driving to coasting and vice versa. The drivers are retained with respect to each other by pins 40 and mating slots 42 for a total rotation, one relative to the other, approximately one half of the backlash described previously. When the pin 34 engages the saddle-shaped depressions 32 on either driver, the force of the contact, by design of the saddles, will be angled outward from the plane of the respective driver and will overcome the component of the reaction force acting opposite created by the inclined edges on the mating teeth on the drivers 30 and couplers 22. For example, saddle angles ranging from 30 to 40 degrees are typically used and create outward axial forces that exceed the inward axial forces created by typical 20 to 25 degree inclines of the coupler and driver mating teeth that would otherwise work to separate the driver from the coupler. Using the foregoing parameters, consider first the vehicle at rest. Assume the two drivers 30 each engage with the respective coupler 22, and for specificity in the starting condition, that the pin 34 is centered in the saddle-shaped depressions 32 in the drivers 30. With the vehicle in gear and engine driving, the pin 34 begins to rotate about the axis of the axle, through the backlash present and compressing against springs 36 to contact the edges of the saddle-shaped depressions 32 in the drivers, and then on further rotation, to force the drivers and couplers, and thus the axles, into rotation. Because the contact angle between the pin 34 and the saddle-shaped depressions 32 exceeds the angle of the edge of the teeth on the couplers and drivers, the force between the pin and the drivers forcing the same into contact against the couplers 22 will exceed the force between the inclined edges of the teeth on the drivers 30 and couplers 22 otherwise tending to force the drivers back toward pin 34, so that the drivers and couplers will remain in positive engagement, regardless of the torque applied to the differential.

If the vehicle now proceeds to drive around a curve, the wheel on the outside of the curve, and thus the coupler 22 associated with that wheel, will tend to rotate faster than the coupler associated with the inside wheel. Assuming power is still being applied, this causes the driver associated with the outside wheel to begin "gaining" with respect to pinion pin 34, the driver rotating forward to a position wherein the saddle-shaped depressions 32 thereon are no longer in contact with pin 34. At this point, pins 40 and mating slots 42 prevent the further relative rotation of the two drivers but allow coaxial translation. Further gaining of the outside wheel continues to rotate the outside coupler at a speed higher than the other differential components. Now, however, the teeth on the driver associated with the outside wheel are free to climb the inclined planes of the teeth on the driver and coupler, with the driver moving toward the pin 34 against the resistance of the associated springs 36 to allow the teeth of the respective driver to slide over the teeth of the respective coupler, repeatedly as required so long as the difference in wheel rotation speeds exist.

If, when in a curve, the vehicle engine is throttled back to coast and the engine is used as a braking or vehicle slowing device, the same basic interaction of parts described above will occur substantially in reverse, now however with the driver and coupler associated with the outer wheel of the curve being engaged, and the driver associated with the inner wheel of the curve climbing over the teeth on the associated coupler as required to allow the inner wheel on the curve to turn slower than the outer wheel. Similarly, in backing around a curve such as backing out of a parking place, the inner wheel will be the drive wheel, as in powering forward, whereas use of the engine to retard the motion of the vehicle when backing will engage the wheel on the outer side of the turn. However in any event, when power is applied while turning to the point that traction is lost by the drive (inside) wheel, pin 34 will catch up to and forcibly engage the appropriate side of the saddle-shaped depression 32 on the outside wheel driver 30, forcing both drivers into engagement with their associated couplers to force rotation of both axles in unison.

The foregoing locking differential and another manufactured by Vehicular Technologies called "Lock Right" perform well, allowing the drive wheels to rotate independently under normal conditions, but causing the wheels to rotate in unison when either wheel loses traction and begins to slip. The Lock Right design differs from the aforementioned design in that it has no springs located in the saddle to dampen the backlash, rather springs are located between the drivers and thus work directly to force the driver teeth into mesh with those on the adjacent coupler. However, these differential designs contain a few particular operating characteristics that may require the vehicle operator to become accustomed to.

In particular, when one wheel begins turning faster than the other, such as when turning into a parking space, one driver will be climbing the teeth on the associated coupler and sliding thereover. When the teeth of the driver again align with the spaces between teeth on the coupler, the driver will fall into engagement with the coupler and shortly thereafter climb the sides of the teeth and again disengage. This makes an audible noise, resulting in a "click, click, click" type sound heard from outside the vehicle. In louder vehicles, such as a high performance vehicle, particularly for one technically versed to understand the source of the sound, the sound is of little consequence. However, to the driver of a more typical, quieter car, the sound can be a distraction, and could be misinterpreted as a mechanical fault or impending mechanical failure. Secondly, a phenomenon called "cycling" can be induced in manual transmission equipped vehicles. Automatic transmissions do not exhibit the condition because the torque converter always maintains a measure of bias load between the engine and drive axle. With manual transmissions, this event occurs when turning at slow speeds with the clutch pedal depressed, such as when turning into a parking space, temporarily decoupling the transmission from the engine and therefore removing any bias load present on the engaged driver and coupler. When the disengaged driver and coupler teeth pass by each other, they briefly reengage, enabling a load to be placed on the differential and axle components. The components between the differential and the wheel then act like an undamped mechanical spring and release the energy by temporarily accelerating the differential, drive shaft and transmission components. The inertia of these components carries the differential pin against the driver saddle, causing the opposite side driver and coupler to lock and continue to process. The continual wind-up and release will build and eventually become sufficient to "rock" the vehicle driveline and require the transmission be put in neutral or the vehicle stopped in order to cease the cycling. Needless to say, this is highly undesirable and would only be acceptable to the very most forgiving of owners. However all drivers whose vehicles represent a standard "as-delivered" condition would appreciate the increased traction a locking differential provides in situations where dry pavement type traction is not available. It would therefore be desirable to provide a differential with substantially the same simplicity as the differentials just described, but which is quiet and smooth in its operation, so as to neither be heard by nor concern the average driver of a vehicle equipped with the locking differential.

Locking differentials are often installed as replacements for open differentials supplied as original equipment. It is desirable to provide a locking differential that can reuse a substantial portion of the original equipment differential, in particular, the original equipment differential case 54. Further, it is desirable to provide a locking differential that can be assembled into the original equipment differential case through an opening in the differential housing without removing the differential from the vehicle. This eliminates the significant expenses of providing a new differential case, of removing and installing the differential case, and of resetting the ring gear and drive shaft pinion gear backlash and alignment. As suggested by FIG. 2, differential cases 54 provide very little clearance for the assembly of parts within. The actual opening in a typical differential housing is more restrictive than that shown in FIG. 2. Parts for a locking differential must be designed both for proper operation and to facilitate assembly.

Referring again to FIG. 1, a typical assembly sequence concludes, after inserting all the pieces except for the pinion pin 34 and the second C clip 24, by shifting all the parts except for an unrestrained coupler 22 as far as possible to the side away from the unrestrained coupler. The objective is to create a space between the unrestrained coupler and the adjacent driver 30 for insertion of the final C clip. When the final C clip is installed, all parts can be moved to their final assembled positions. Insertion of the pinion pin 34 holds all parts in their assembled positions.

Recessed areas 86 are provided in the face of the drivers 30 in some prior art locking differentials. These recessed areas are to provide a space through which the C clips 24 may be inserted once the drivers and couplers have been assembled into the differential case and the axles put adjacent their final axial position. However the recessed areas 86 interrupt the continuity of the distribution of the teeth on the drivers, creating a lack of symmetry therein. The forces carried by the teeth on one side of the driver must be balanced by forces in the reduced number of teeth on the opposite side. Consequently, the load on the teeth of the drivers and couplers is not equally distributed among the teeth. This also creates a cocking force between the drivers and respective couplers which, particularly for less than full tooth engagement, results in the plane of the drivers and couplers not remaining accurately parallel. Further, for any two engaging teeth, the load on the area of engagement of the teeth is not equally distributed over the engaging area. The net result of the asymmetry is faster tooth wear than necessary, and reduced resistance to abuse because of load concentrations. Also, recessed areas 86 have to be located at an axial position where the C clip 24 may be slid onto the C clip groove in the axle. This may not be the final position of the axle, but it must be in the insertable range of the axle into the differential assembly. This predetermines limits for the axial position of the recess and, in turn, constrains the relative thicknesses of the drivers and couplers, preventing the optimization thereof to equalize the strength of the drivers and couplers.

An improved design for a positive acting differential is described in U.S. Pat. No. 5,901,618, issued May 11, 1999, assigned to Vehicular Technologies, Inc., and incorporated herein by reference. This design, shown in FIG. 3a, employs a ring structure 58 fitted to each coupler 50 to prevent premature engagement of the adjacent driver 52. The spacers 56 are modified to provide a notch 68 to fit the spacers to the pinion pin 34. This causes the spacers to rotate with the pinion pin. A paddle 64 is added to the spacer to transmit the pinion pin motion to the ring structure with a predetermined amount of backlash. The length of the spacer is increased to provide for the depth of the notch. This increased length makes assembly of a positive acting differential in an original equipment differential case 54 even more difficult.

Accordingly, it is desired to provide a positive acting differential that can be assembled in an original equipment differential case while the differential housing remains assembled to the vehicle. Further, it is desired to provide a design that can accommodate assembly with spacers of substantially increased length. Still further, it is desired to provide a positive acting differential that eliminates the recess in the face of the drivers and the resulting undesirable load distributions.

BRIEF SUMMARY OF THE INVENTION

The present invention provides positive acting differentials of the type having toothed drivers and couplers which automatically connect the two axles together to provide optimum traction for the vehicle, yet releases one axle when the vehicle is proceeding around a curve without drive wheel slippage, whereby only a single axle is engaged through the drive system. In assemblies of the type wherein the axles are retained in the assembly by a C clip and a thrust slug, at least one driver and one spacer are slotted so as to provide space for the insertion of the C clip during assembly, and the thrust slug is fitted within the spacers. This allows selection of the driver and coupler thicknesses without being restricted by the possible positions of the C clip groove in the axles during assembly, and reduces wear in the driver and coupler teeth by eliminating asymmetry between the engaging drivers and couplers. Preferred and some alternate embodiments are disclosed.

BRIEF DESCRIPTION OF THE DRAWINGS

FIG. 10 is a view similar to FIG. 9, illustrating the relative part positions as the coupler being illustrated continues to rotate faster than the coupler for the wheel still being driven and the teeth on the driver 52 begin to climb the teeth on the coupler 50.

FIGS. 10a and 10b illustrate the extended teeth 78 and the driver 52 relative to the slot in the synchro ring 58 before the climbing of the teeth on the coupler 50 begins, and again just after climbing has been completed.

FIG. 14 illustrates the position of the pins 72 in slots 74 when the drivers are in alignment. It also shows the saddle-shaped depressions 70 of the two drivers centered with respect to pinion pin 34.

FIG. 15 illustrates the position of the pins 72 in slots 74 when one driver is advanced relative to the other driver and remains with pin 34 engaged with the side of the saddle-shaped depression of one driver.

DETAILED DESCRIPTION OF THE INVENTION

Figure 1:
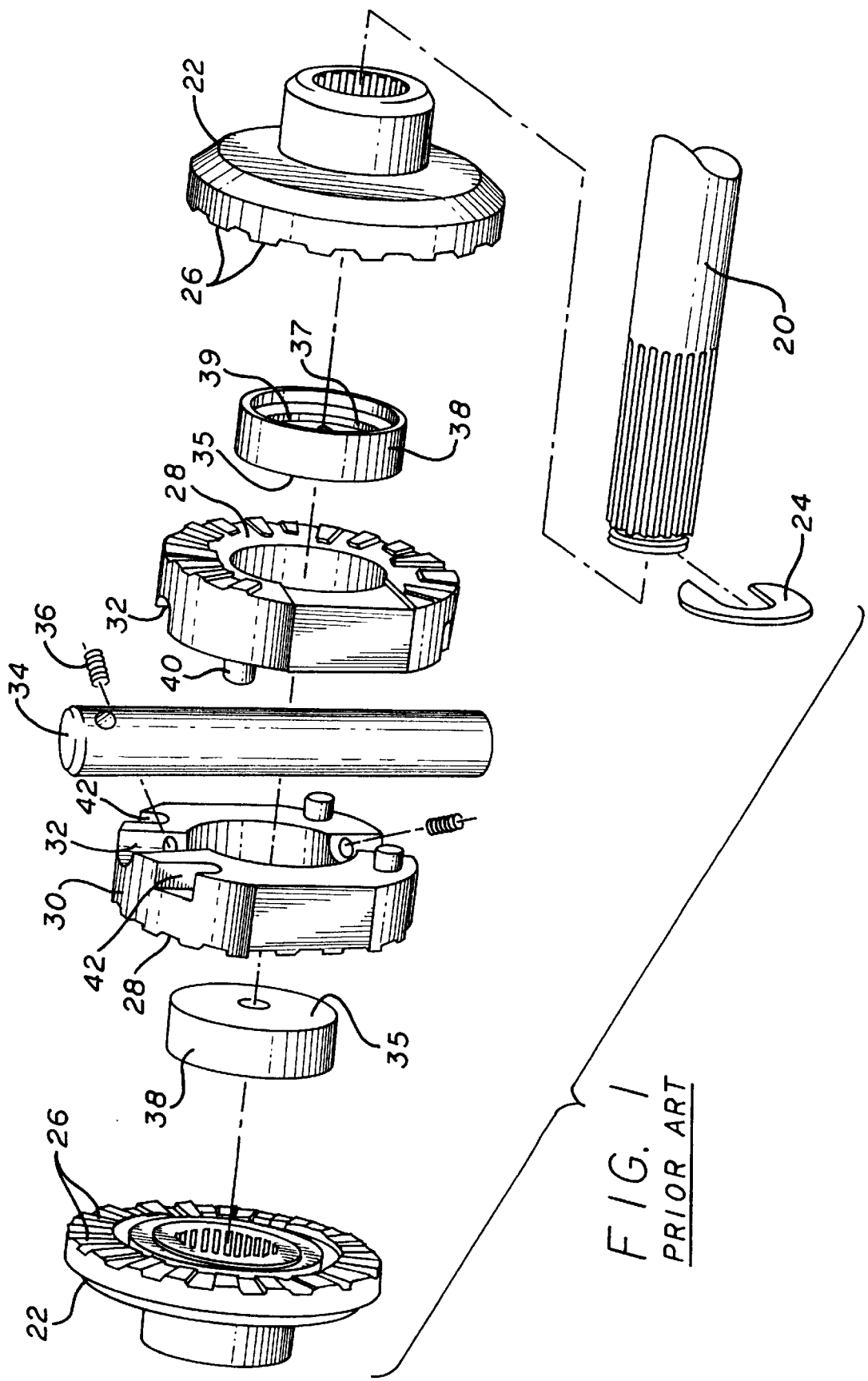
FIG. 1 is an exploded perspective view of a prior art locking differential.
Figure 2:
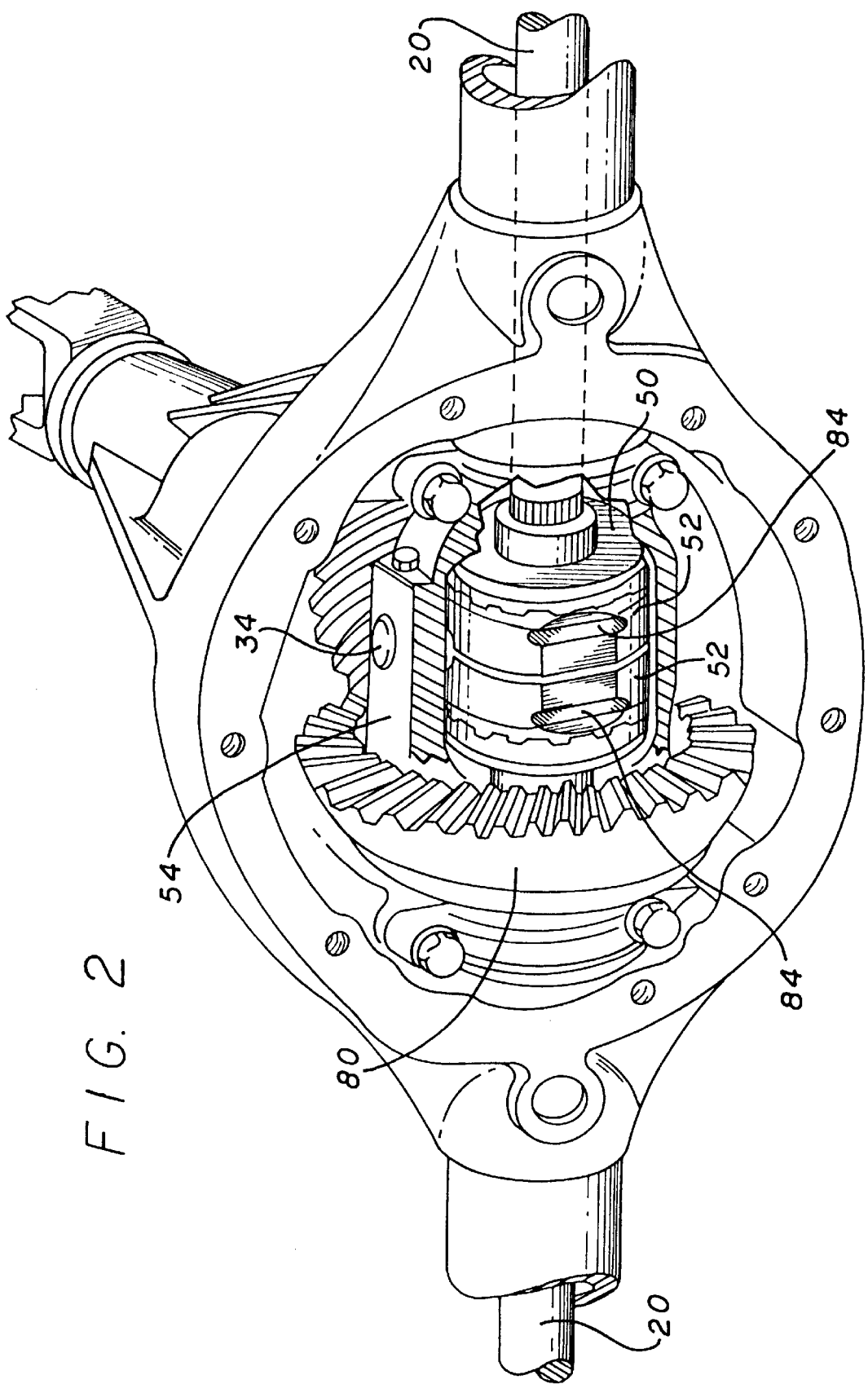
FIG. 2 is a rear view, cover off, of a differential incorporating the present invention.
Figure 3:
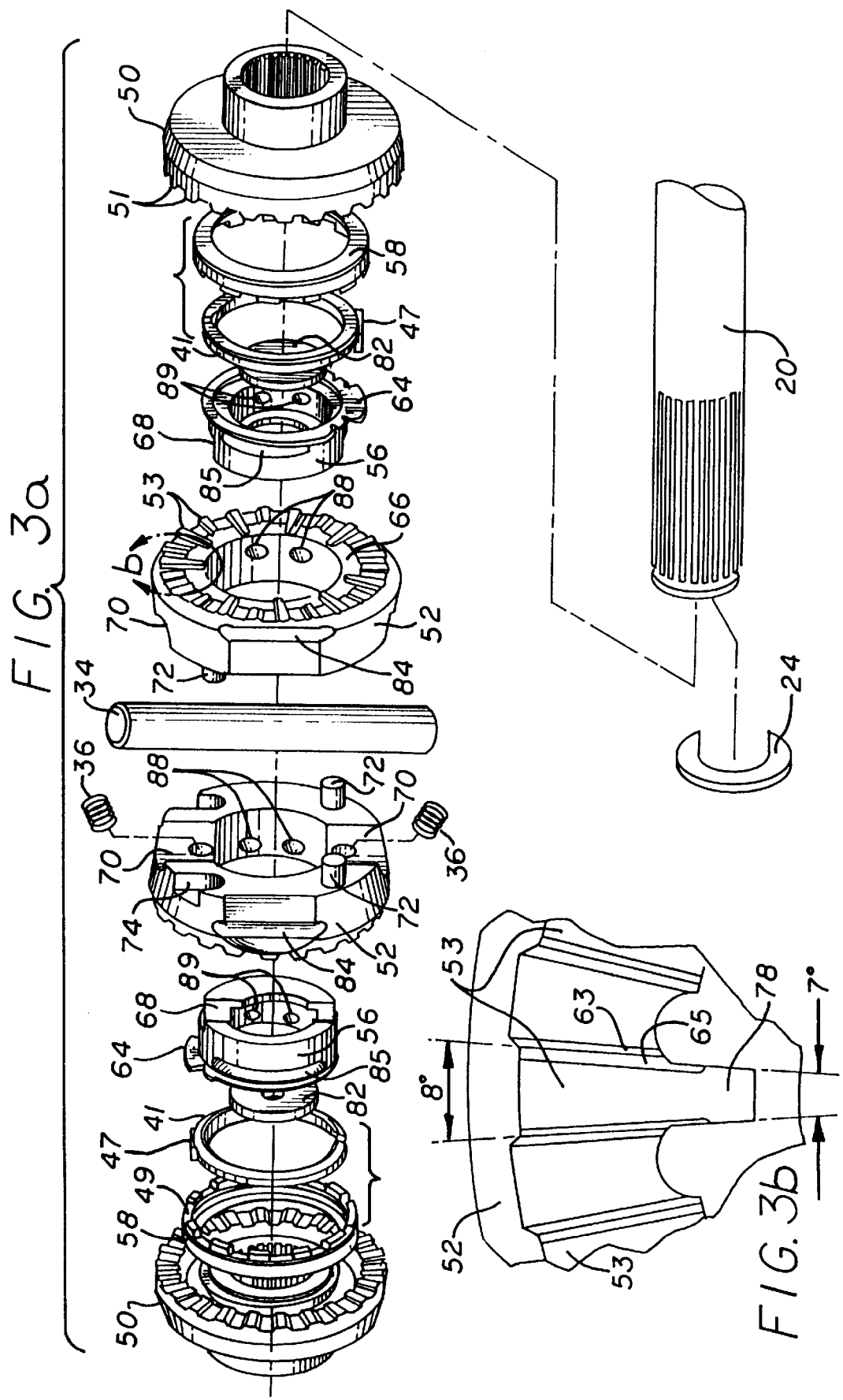
FIG. 3a is an exploded perspective view of the differential of FIG. 2 illustrating the various parts of one embodiment of the present invention.
FIG. 3b is an enlarged view of a portion of the teeth on a driver illustrating the chamfering of the teeth thereon.

Referring to FIG. 2, a differential incorporating the present invention may be seen. The parts of the differential of the present invention visible in this figure include couplers 50 and driver 52 fitting within differential case 54. The differential shown in FIG. 2 is shown in an exploded view in FIG. 3a, similar to the exploded view of the prior art locking differential of FIG. 1, but further illustrating improvements of the present invention.

As shown therein, the preferred embodiment of the present invention includes spacers 56 with slots 85, drivers 52 with slots 84, and thrust slugs 82. Each spacer axially aligns a driver with a coupler 50. The spacer is located substantially within a driver and is concentric with and located by the coupler. The thrust slugs are loosely fitted within the spacers to provide the desired spacing between the ends of the axles 20 and the pinion pin 34. The loose thrust slugs and the slots 84, 85 in the spacers and the drivers facilitate assembly of the C clips 24 to the axles 20, as will be further described below.

Synchro rings 58 (ring-like structures) each fit within a relief 60 in the face of the respective coupler 50. As may be seen in FIGS. 3a, 4, and 5a–g, each relief 60 of this embodiment has a cylindrical outer diameter within which the synchro ring 58 slides, with the inner surface 43 of the relief being angled or tapered to form a conical section. In one embodiment (not shown), each synchro ring is a split ring-like structure of a cooperative cross section and diameter to allow elastically changing its diameter for assembly purposes, with the synchro ring elastically closing so as to elastically frictionally grip the conical tapered inner surface 43 to provide the desired rotational drag with respect thereto, and to encourage the synchro ring into sliding frictional engagement with the back wall of the relief 60 for positive longitudinal location thereof. In this embodiment, the tolerance for the radial position of projections on the periphery of the synchro ring is increased because the assembled diameter of the synchro ring is dependent on the diameter of the conical tapered inner surface 43.

Figure 4:
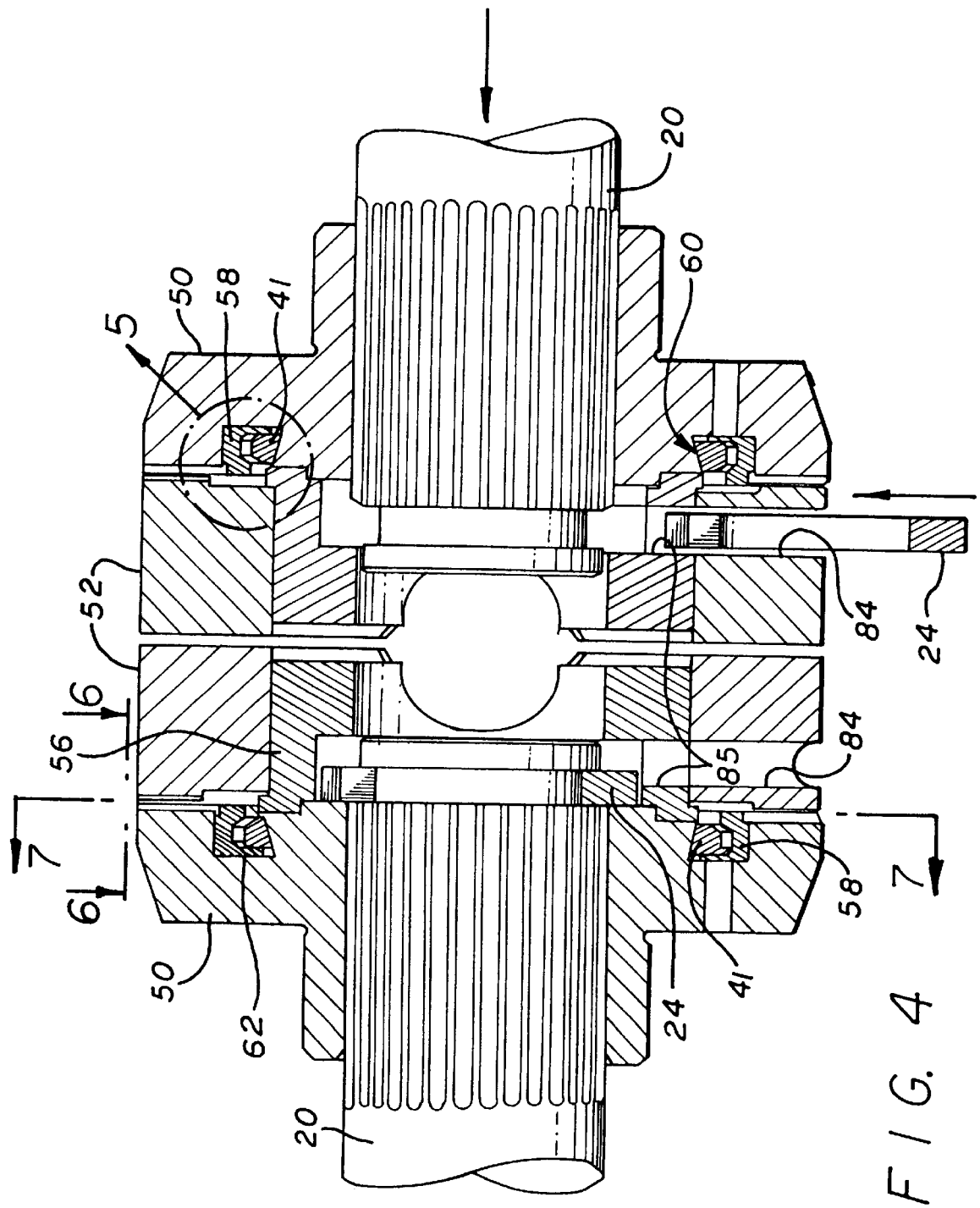
FIG. 4 is a partial cross section of the positive acting differential of FIG. 2.

In the preferred embodiment, shown in FIGS. 3a, 4, and more particularly in FIGS. 5a through 5f, each synchro ring 58 is a solid piece that closely fits against the back and the outer diameter of the relief 60. A restraining member holds the synchro ring 58 in the relief 60 so that the synchro ring may be forcibly rotated within the relief. The restraining member can be any form of mechanical restraint that holds the synchro ring firmly against the back of the relief.

An exemplary embodiment of a restraining member is a drag clip 41 as shown in FIGS. 3a and 5a–g. Each drag clip 41 is a split ring-like structure of a cooperative cross section and diameter to allow elastically changing its diameter for assembly purposes, with the drag clip elastically closing so as to elastically frictionally grip the conical tapered inner surface 43 to provide the desired rotational drag with respect thereto, and to encourage the respective synchro ring into sliding frictional engagement with the back wall of the respective relief 60 for positive longitudinal location thereof. Each drag clip may be rotationally confined with respect to the respective synchro ring so that the two effectively rotate in unison as shown. In an alternate embodiment (not shown) the drag clip may be rotationally independent of the synchro ring and may or may not rotate relative to the coupler.

Figures 5A, 5B:
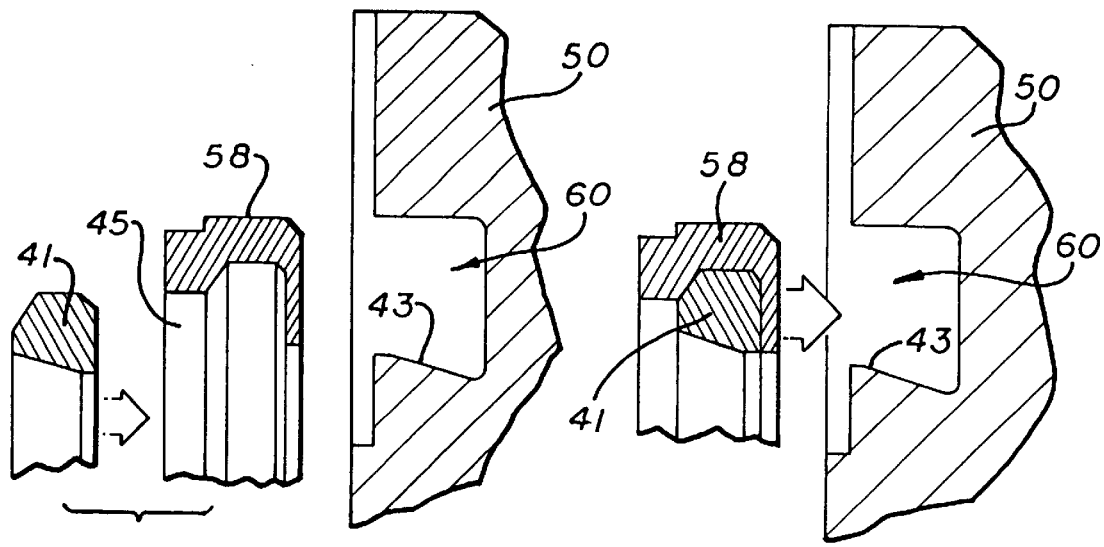
FIGS. 5a through 5g are cross sectional views of the synchro ring and drag ring taken on enlarged scale of region 5 of FIG. 4, illustrating the assembly and function of the synchro ring and drag ring.
Figures 5C, 5D:
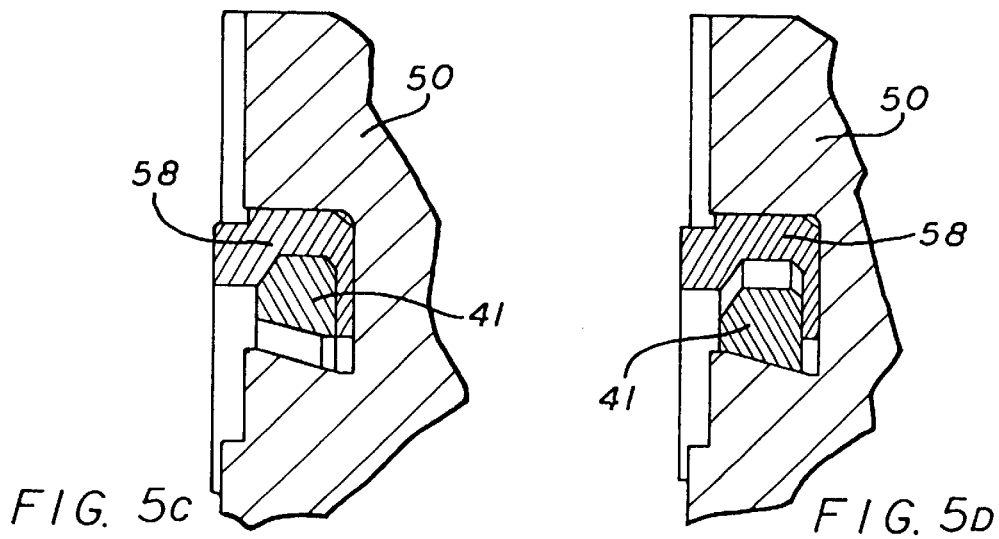

Referring now more specifically to FIGS. 5a through 5g, and more particularly starting with FIG. 5a, the exemplary embodiment uses a drag clip having an outer diameter, when undeflected, which is smaller than the diameter of the annular surface 45 of the synchro ring 58 so that the drag clip will slip into the recess in the synchro ring. Once inserted, the drag clip 41 is elastically opened to a larger diameter as shown in FIG. 5b, and the assembly of the synchro ring and drag clip is inserted into the relief 60 in the coupler, as shown in FIGS. 5b and 5c. In practice, once the leading edge of the inner diameter of the drag clip clears the leading edge of the conical tapered inner surface 43 of the relief 60, the drag clip may be released and rotated to allow the drag clip to seek the position shown in FIG. 5d.

Figure 5E:
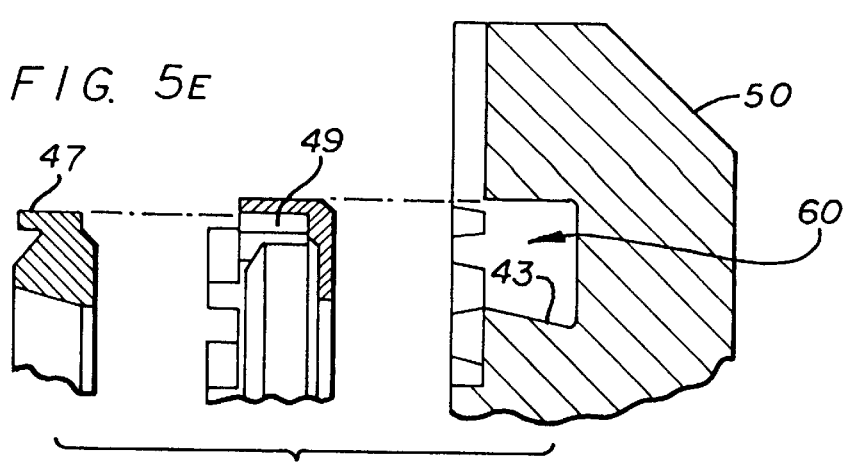
Figure 5F:
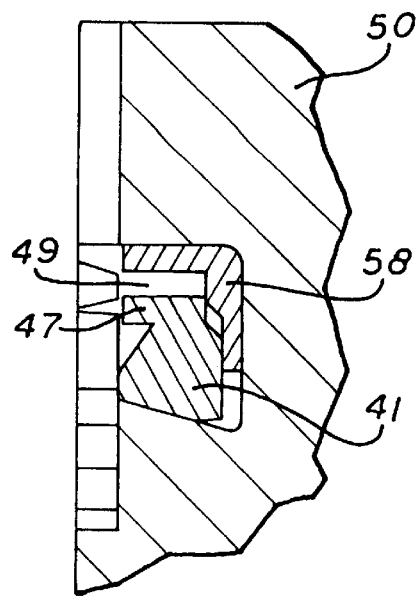
Figure 5G:
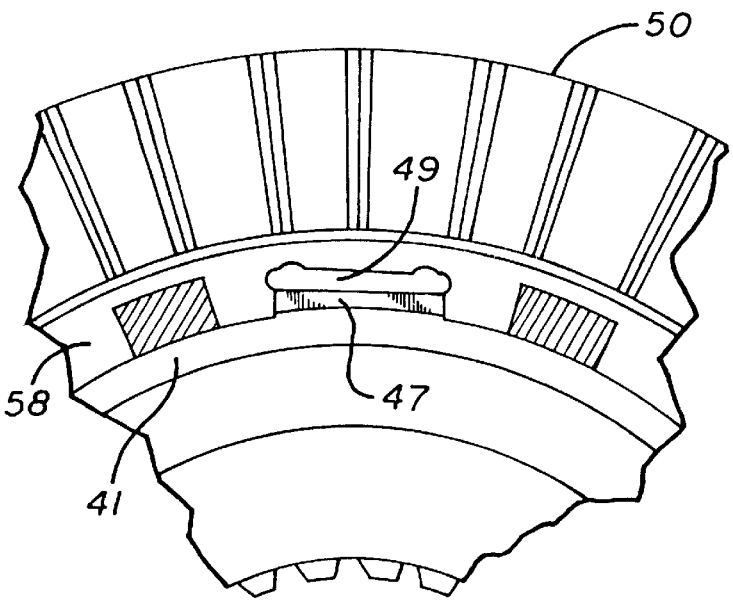

FIGS. 5e, 5f and 5g illustrate the provision to angularly confine the synchro ring 58 with respect to the drag clip 41. In particular, the cross sections of FIGS. 5e and 5f and the face view of FIG. 5g illustrate the area of the synchro ring and drag clip wherein the drag clip has a projection 47 fitting within a relief 49 in the synchro ring. There is very little circumferential clearance between the two parts, but there is sufficient radial clearance to allow relative radial motion as required for assembly purposes. The drag clip 41 causes the synchro ring 58 to rotate with the coupler 50 unless restrained, whereupon the drag clip frictionally slides on the tapered surface of the relief 60 of the respective coupler.

As may be seen in FIG. 3a, the spacers 56 each have a paddle-like projection 64 thereon, which fit into a specific location of the synchro ring 58. In the preferred embodiment, the projection 64 is received in the relief 49 that also receives the projection 47 on the drag clip 41. In the preferred embodiment described herein, the width of the paddle 64 is smaller than the relief 49 within the synchro ring 58 in such a manner as to allow a 10° total rotation of the synchro ring 58 relative to the spacer 56. Thus, within that given freedom, each synchro ring 58 will rotate in unison with the respective coupler 50, though the synchro ring will be restrained by the paddle 64 when contacting the same and will no longer rotate with the respective coupler should the coupler continue to rotate beyond that specified freedom.

Each driver 52 has a relief 66 therein for receiving the paddle 64 on the spacer 56. This relief 66 allows the spacers 56 to fit within the inner diameter of the respective drivers 52 and to be flush with the face thereof, so as to allow the parts to slide into the one-piece differential case 54 (FIG. 2).

Once installed, the spacers 56 are each moved axially toward their respective couplers 50 so that the paddles 64 fit within the gap in the synchro rings 58. The spacers 56 are retained in their final position by the insertion of pin 34 which has a close fit with notches 68 in the spacers 56 in the final assembly. The slot in the spacer need not engage the entire surface of the pinion pin. As may be seen in FIG. 4, the slot may have a generally rectangular cross section, perhaps with filleted corners. The slot has a depth of less than the radius of the pinion pin and a width such that the top edges of the slot closely fit the pinion pin when the pin contacts the bottom of the slot. Therefore the pin contacts the spacer slot generally along three lines of contact. Thus, spacers 56 in the final assembly have no intentional rotational freedom about the axis of the assembly relative to pin 34, but rather in essence rotate in unison with the pin and, thus, with each other. This is to be compared with the drivers 52, which as with the prior art locking differential herein before described, have a total rotational freedom about the axis of the assembly with respect to pin 34 of approximately 5° because of the loose fit of the saddle-shaped depressions 70 on the drivers. Similarly, the drivers 52 have a relative rotation capability, one to the other, of approximately 1.5°, determined by the fit of pins 72 and slots 74 in the drivers. This is illustrated in FIGS. 14 and 15, wherein FIG. 14 illustrates the position of the pins 72 in slots 74 when the drivers are in alignment and having their saddle-shaped depressions 70 centered with respect to pin 34 of the two drivers 52, and FIG. 15 illustrates the position of the pins 72 in slots 74 when pin 34 is engaging the sides of the saddle-shaped depressions on one driver and the other driver is advanced with respect to the pinion pin 34.

Finally, as may be seen in FIGS. 7 to 13, certain teeth 78 on the face of drivers 52 extend to a diameter different than the teeth 51 (FIG. 3a) on the couplers 50, and the remaining teeth 53 on the drivers 52. Protrusions are formed by these extended teeth 78 that are intended to work with slots 76 in the synchro ring 58. (A circular pattern of protrusions could be formed separate from the teeth and be just as functional, however, perhaps not as efficient to produce as the extended teeth.) These protrusions have the same spacing as the slots 76 in the synchro rings 58 and in the embodiment presented, will fit within slots 76 with a total angular freedom between a driver 52 and a synchro ring 58 of approximately 9.6 degrees. This opening can range however, from a minimum equal to half of the saddle backlash to a maximum equal to the angle between driver teeth plus half of the saddle backlash.

Figure 7:
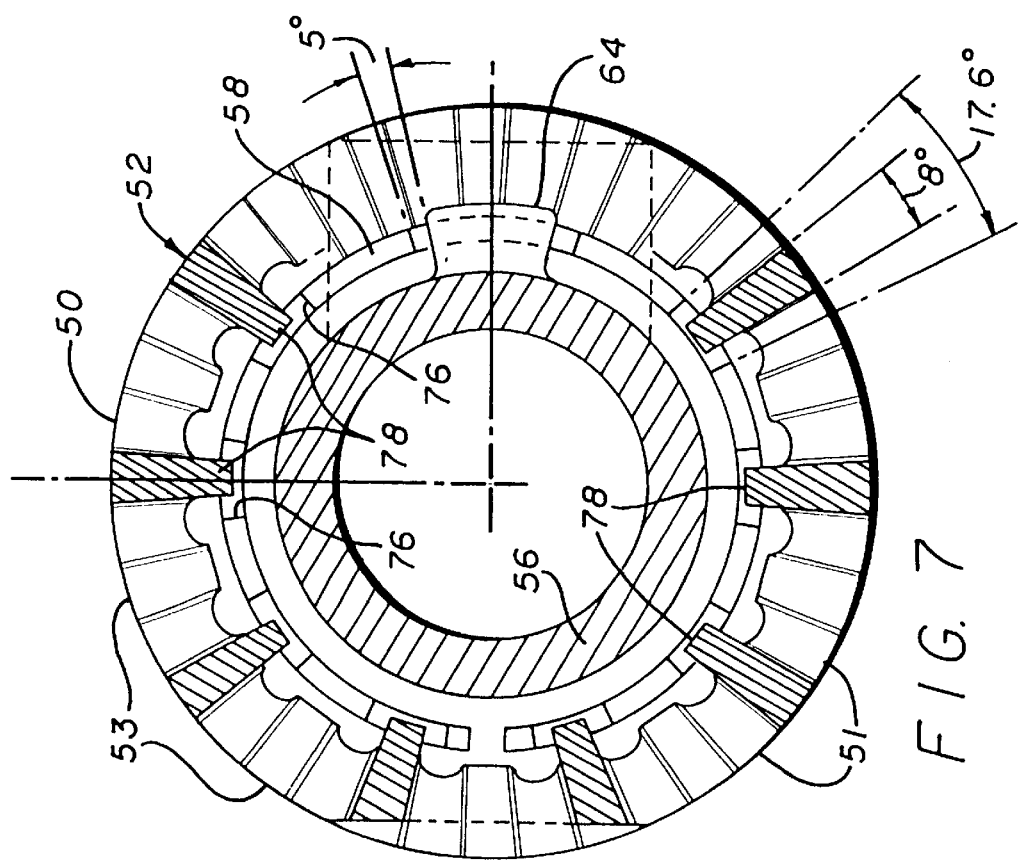
FIG. 7 is a cross section through the positive acting differential of the present invention taken along the line 7—7 of FIG. 4 and showing the parts in a symmetrical positions.

The general relationship just described may be seen in FIG. 7, which is a cross section through the positive acting differential taken along the line 7—7 of FIG. 4, though with only the cross section of the extended teeth of the driver, not all teeth of the driver, being shown so as to make the coupler teeth thereunder viewable in the figure. This allows the relative positions of the driver and the associated coupler to be easily viewed, though a true cross section would show all teeth of the driver in cross section, tending to obscure the relative position of the associated coupler thereunder. This illustrative license is continued in FIGS. 8 through 13 for the same ease of visualization purposes.

FIG. 7 illustrates the fitting of the paddle 64 in the gap of the synchro ring 58, as well as the fitting of the protrusions formed by the extended teeth 78 of the drivers 52 into the slots 76 in the synchro rings 58. In FIG. 7, all parts are angularly centered with respect to each other, the paddle 64 being centered in the gap in the synchro ring 58, the extended teeth 78 being centered in the slots in the synchro ring 58, and, since the spacer 56 is rotationally locked with respect to pin 34 (FIG. 3a), the drivers 52 are necessarily positioned with their saddle-shaped depressions 70 centered with respect to pin 34.

As with the prior art, when the pin 34 engages the saddle-shaped depressions 70 on either driver, the force of the contact, by design of the saddles, will be angled outward from the plane of the respective driver. The preferred embodiment in which the present invention is used includes a departure from the prior art related to the design of the saddle by including the displacement of the synchro ring. Previous saddle designs use pin and slot geometry that centers the disconnecting driver saddle on the pinion pin and generate a helical surface running from a cutter depth equal to the radius of the pin out beyond the top surface of the driver. The depth of the saddle is held equal to the pin radius and the thickness of the driver is such that when the driver is disconnected, the inner surface of the driver does not pass the centerline of the pin. These features facilitate manufacturing, but do not optimize backlash.

The present embodiment uses saddle geometry that optimizes backlash while creating conditions for correct positioning of the synchro ring. Backlash is optimized by recognizing that the driver needs to displace an amount only slightly greater than the height of the teeth multiplied by the tangent of the maximum saddle angle. The result is much less than half the saddle travel as used in previous designs. This minimum displacement is further modified by adding an amount to achieve a desired displacement of the pin and effect removal of the overlap of the synchro ring with the protruding teeth of the driver when the vehicle changes from driving to coasting. This amount is determined by examining the free travel of the pin from contact with the near-side of the connected driver saddle to contact with the far-side of the disconnected driver saddle. This travel must be such that by virtue of the pin carrying the spacer whose paddle moves the synchro ring, the synchro ring is moved to allow the teeth of the driver and coupler to mesh when synchronized. Once meshed, the teeth can then transmit torque, both driving and coasting/braking.

Figure 6A:
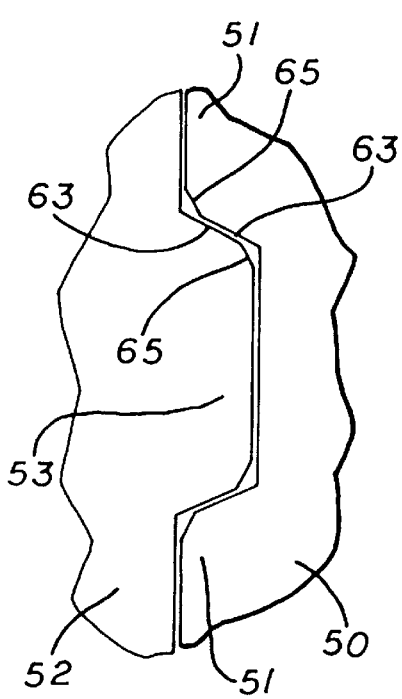
FIGS. 6a and 6b are illustrations of the chamfered tooth profile of the chamfered teeth on the drivers and the couplers when in different relative positions, as viewed along lines 6—6 of FIG. 4.
Figure 6B:
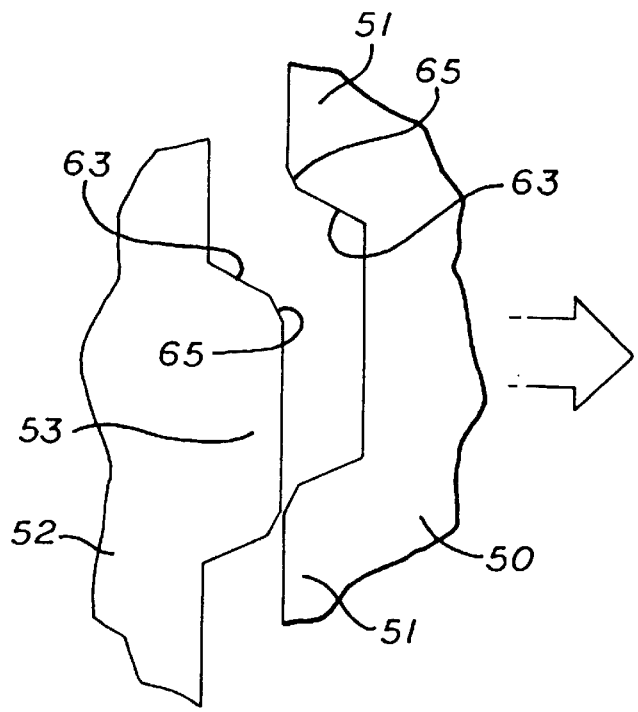

The edges on the mating teeth on the drivers 52 and couplers 50 are not square. Instead, the mating teeth are inclined in the base regions 63 thereof (see FIGS. 6a and 6b) at an angle less than that of the saddle, and the outer regions of the teeth are chamfered at an angle substantially exceeding the saddle angle. (The chamfer does not extend to the extended part of the teeth (see FIG. 3b) but rather the extended part of the teeth maintains a rectangular cross section.) Consequently when the teeth on the drivers and couplers are near or in full engagement and the pin 34 is forcibly engaged with the drivers, the net outward force on the drivers keeps the teeth on the drivers from climbing the sides of the teeth on the couplers, but allows the climbing of the teeth when pin 34 is not forcibly engaged with the respective driver. However, when the teeth on the drivers and couplers are only in slight engagement on chamfered regions 65 and the pin 34 is forcibly engaging the respective driver, the net force on the respective driver is inward toward the pin 34, allowing the climbing of the teeth in spite of pin 34 being forcibly engaged with the respective driver. It can be shown that for typical dimensions used for the tooth height and driver and coupler diameters, the total rotation of a driver relative to the respective coupler from the beginning of driver teeth climbing on the coupler teeth to the point where climbing is complete and the top of the driver teeth will begin to slide over the top of the coupler teeth is approximately 0.75°.

In the embodiment described above, the chamfer does not extend to the extended part of the extended teeth 78 (see FIG. 3b) but rather the extended parts of the teeth maintain a rectangular cross section (see FIG. 10a). It is possible to obtain the effects described even when the chamfer is provided on the teeth of only the drivers 52 or only the couplers 50. This embodiment simplifies fabrication of the driver 52 because it eliminates the requirement for a chamfer along only a portion of the extended teeth 78.

The angular motion limits and tooth angles for the embodiment described herein may be summarized as follows:

| Parts | Angular motion limits |
|---|---|
| Driver to pin 34 | 2.5° |
| Driver to driver | 1.5° |
| Paddle to pin 34 | ~0° |
| Paddle to ring | 5° |
| Ring to extended tooth on the driver | 4.8° |
| Driver to coupler tooth climbing - start to finish | ~0.75° |
| Driver and coupler tooth angle base of teeth (from line parallel to axles) | Approx. 23° |
| Driver and coupler tooth angle outer region of teeth (from line parallel to axles) | Approx. 65° |
| percent of tooth length in base region | Approx. 80% |
| Pinion pin to driver engagement angle (from line parallel to axles) | Approx. 35° |

FIG. 7 represents an arbitrary starting point for the description of the operation of the present invention. It represents a good point to start the description, as it illustrates the general symmetry of the structure and thus the similarity in the operation of the various parts while the vehicle is powering forward, powering in reverse, using the engine to retard forward motion or using the engine to retard rearward motion.

Figure 8:
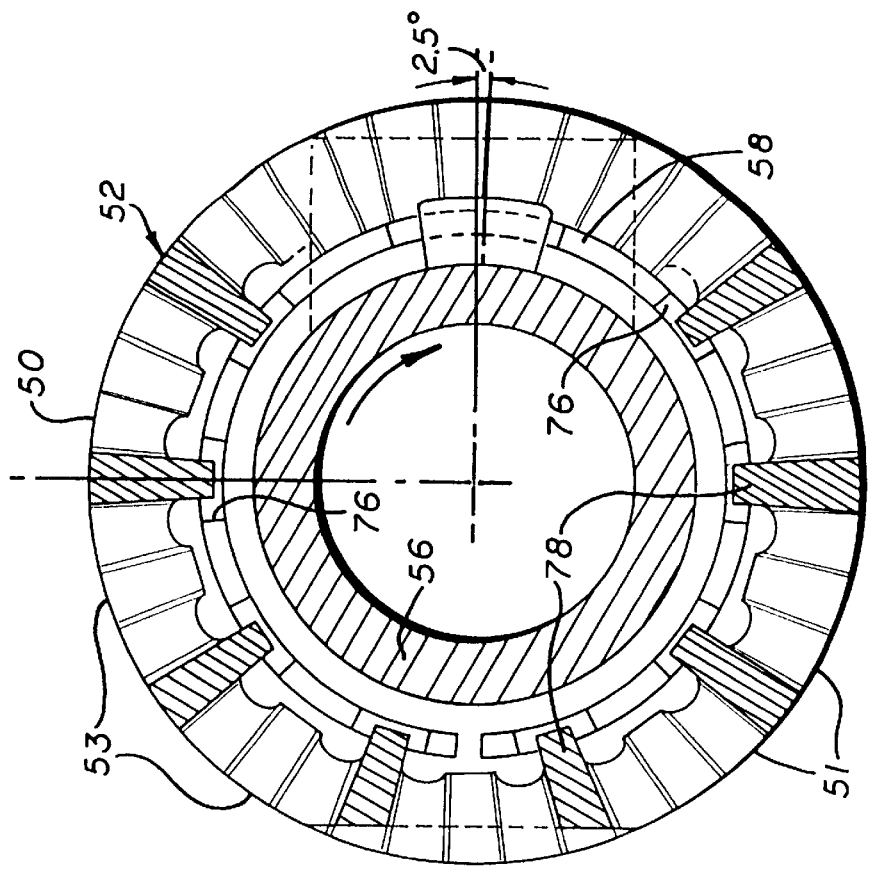
FIG. 8 is a view similar to FIG. 7, illustrating the relative part positions as the ring gear 80 (FIG. 2) begins to rotate.

Starting from the condition of FIG. 7, as the ring gear 80 (FIG. 2) begins to rotate, pin 34 (FIGS. 2 and 3) initially rotates spacer 56 and paddle 64 2.5 degrees, as shown in FIG. 8. In that regard, it is to be remembered that spacer 56 is essentially coupled to the pin 34 (FIGS. 2 and 3) so as to rotate with the pin and thus with the ring gear. Also, the frame of reference for this Figure as well as FIGS. 8 through 13 is the driver, and accordingly, all of the foregoing Figures have the extended driver teeth shown in cross section in the same position, with the other parts of the assembly moving as appropriate to illustrate the relative positions of the parts during various phases of operation hereafter described.

When the spacer 56 has rotated 2.5 degrees as in FIG. 8, paddle 64 approaches one end of the opening within synchro ring 58. At the same time, the pin 34 (FIGS. 2 and 3) is forced against the saddle-shaped depression 70 in the driver so that no further clockwise rotation of the paddle with respect to the driver 52 may occur. Under this condition, the pin 34 pushing against the edge of the saddle-shaped depression in the driver forces the driver into engagement with the teeth of the coupler 50 to provide a positive drive for the respective axle of the vehicle.

Figure 9:
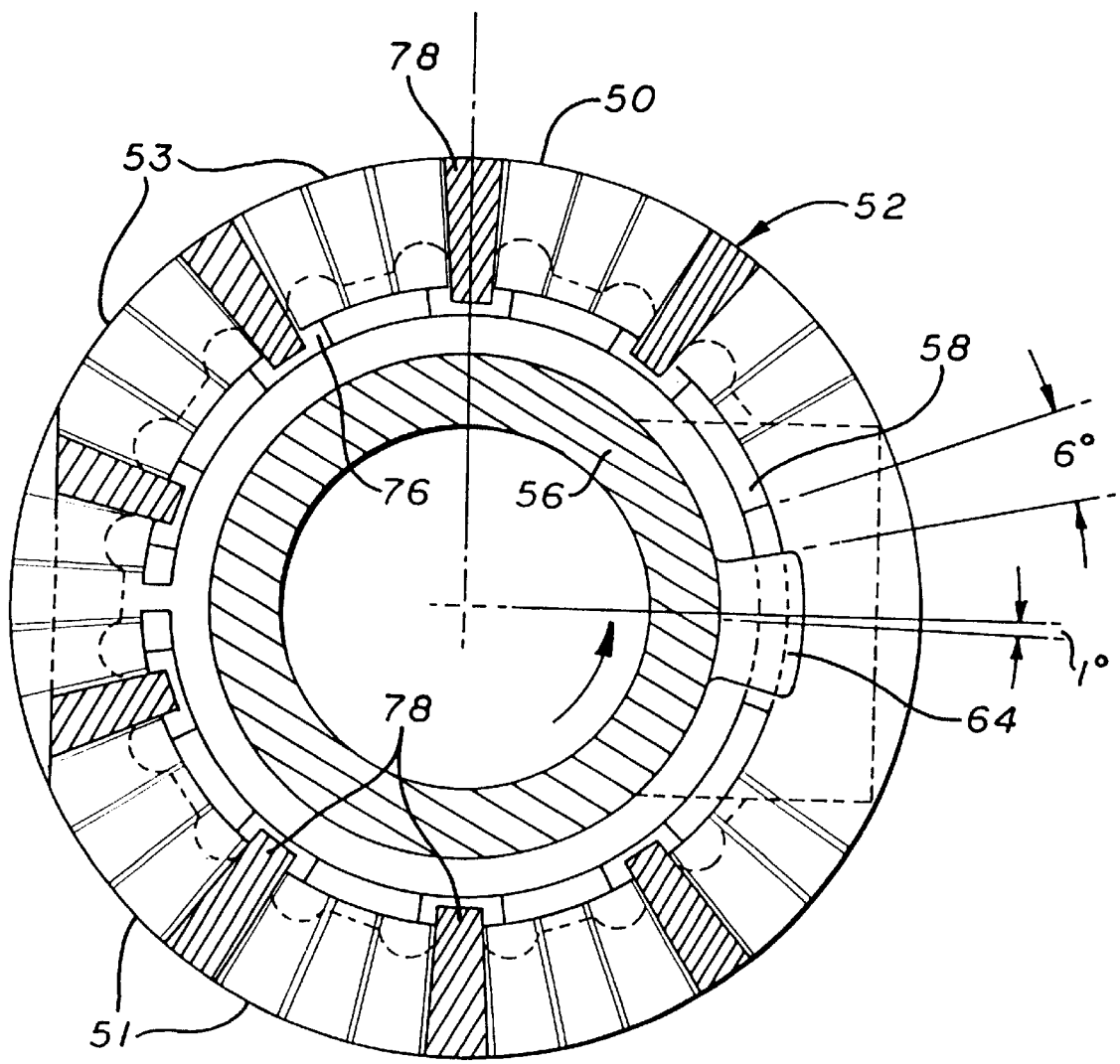
FIG. 9 is a view similar to FIG. 8, illustrating the relative part positions when the wheel for the assembly being illustrated begins to rotate slightly faster than the opposite wheel, as when the vehicle begins to be powered around a curve.

Assuming both axles of the vehicle are being driven, FIG. 9 illustrates what happens when the wheel for the assembly being illustrated begins to rotate slightly faster than the opposite wheel, as when the vehicle begins to be powered around a curve. Specifically, spacer 56 rotates to the relative position with respect to driver 52 shown in FIG. 9, the coupler 50 forcing the driver to a position advanced with respect to pin 34. However, assuming the other axle is still being driven, the driver 52 for the wheel turning faster will reach the limit of its rotational capability with respect to the opposite driver of 1.5 degrees because of the engagement of the pins 72 and the slots 74. Accordingly, as the coupler being illustrated continues to rotate faster than the coupler for the wheel still being driven, the teeth on the driver 52 begin to climb the teeth on the coupler 50, as illustrated in FIG. 6. (See also FIGS. 11a and 11b.) As the coupler rotates in the direction of the arrow shown therein, the total relative angular rotation between the coupler and driver for the driver teeth to fully climb the teeth on the coupler (FIG. 10) is on the order of 1 degree or less, in the exemplary embodiment being approximately 0.75 degrees. This brings the synchro ring 58 to within approximately 5.25 degrees of the paddle 64 and the extended teeth 78 within approximately 4.0 degrees of the edge of the slots in the synchro ring 58. This is shown in FIGS. 10a and 10b, illustrating the extended teeth 78 and the driver 52 relative to the slot in the synchro ring 58 before the climbing of the teeth on the coupler 50 begins, and again just after climbing has been completed.

Of particular importance is the relative location of the parts after such climbing has been completed. In particular, the top of the teeth on the driver 52 are now free to slide across the top of the teeth on coupler 50. Further, the top of synchro ring 58 is slightly spaced from the top of the teeth on the driver 52, something in the order of a few thousandths of an inch. Thus, while there is still a slight separation between the extended tooth 78 and the edge of a slot in synchro ring 58, the synchro ring 58 is in fact free to move to a position slightly under the top of the extended tooth 78. In the preferred embodiment this engagement is on the order of 0.020 to 0.060 inches.

Figure 11A:
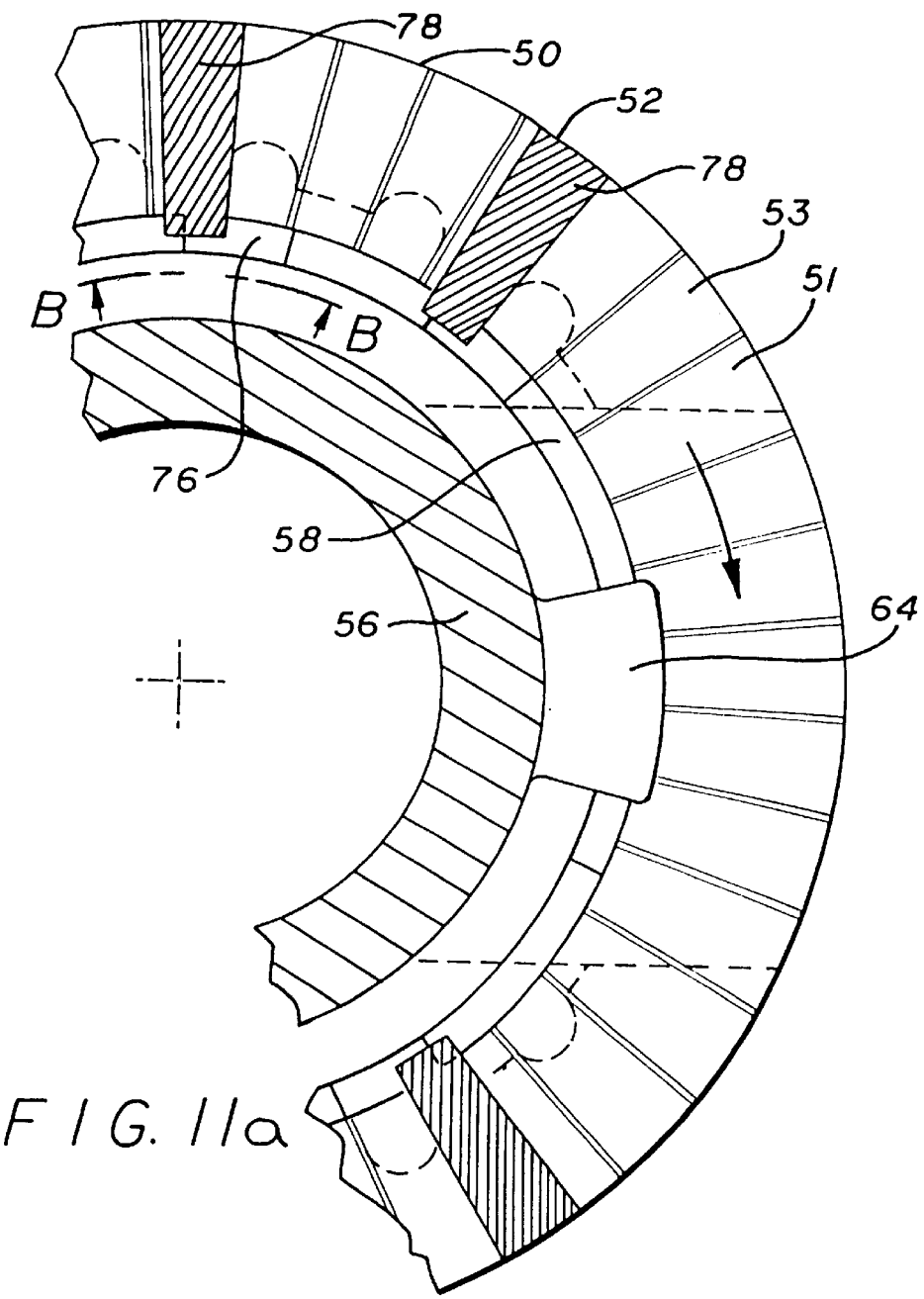
FIGS. 11a and 11b illustrate the relative part positions as the coupler being illustrated continues to rotate relative to the driver from the position shown in FIG. 10.
Figure 11B:
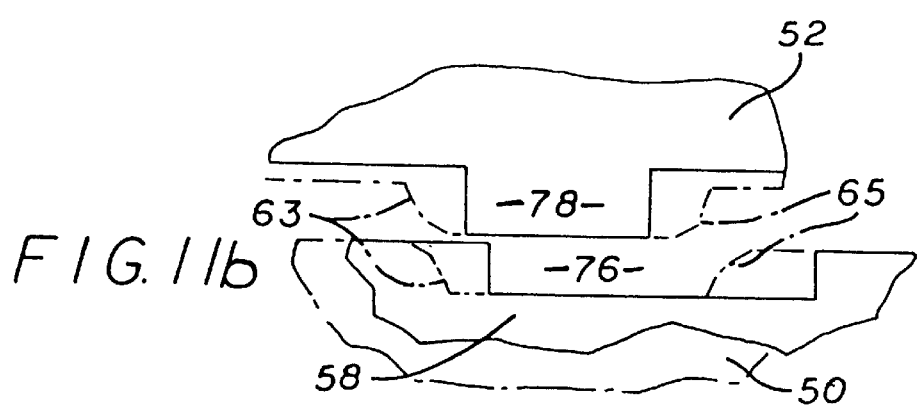

As the coupler 50 continues to rotate relative to the driver, synchro ring 58 will continue to rotate with the coupler 50 another 5.25 degrees before contacting paddle 64. This will bring synchro ring 58 under the extended teeth on driver 52, as shown in FIG. 11a, and more clearly in FIG. 11b. Because the spacer 56 is essentially locked to the pin 34 (FIG. 3) and driver 52 is limited against further motion by pins 72 and slots 74 between the two drivers (see FIG. 3), the driver 52 and the spacer 56 will remain in the position shown in FIG. 11, as will the synchro ring 58, the synchro ring slipping on the coupler as the coupler continues to rotate in the direction shown. On continued rotation of the coupler in the same direction, each time the coupler teeth come into alignment for potential engagement with the driver teeth, the synchro ring 58 will hold the extended teeth in the driver to prevent significant engagement with the coupler, more particularly only slight engagement by the chamfers on the teeth. This eliminates the noise of the repeated engaging and disengaging of the freewheeling driver and coupler experienced in the prior art. Of particular importance to achieve this is the fact that the synchro ring surface adjacent the edge of each of slots 76 therein will just barely clear the extended tooth on the driver after the teeth climbing has been completed.

Figure 12:
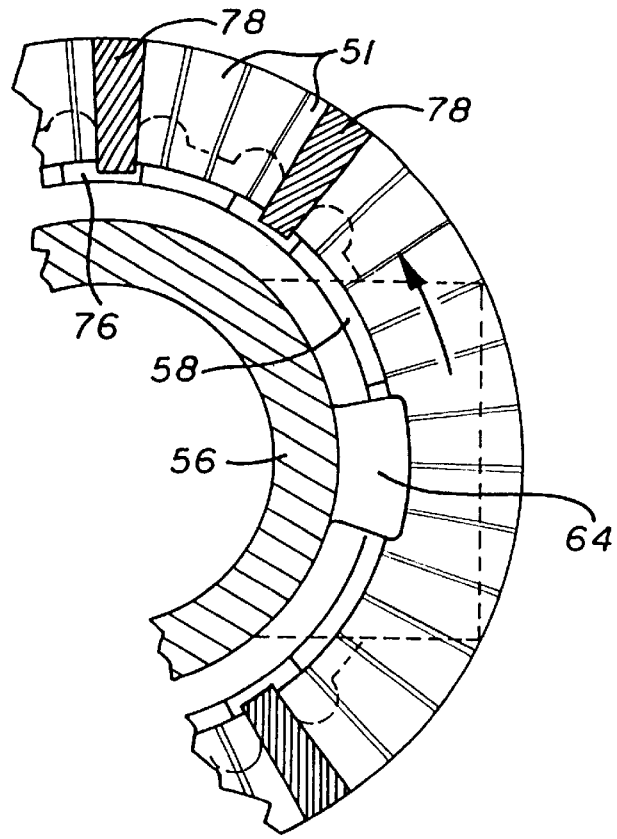
FIG. 12 illustrates the relative part positions as the coupler 50 begins to rotate in the counter-clockwise direction with respect to the driver 52.
Figure 13:
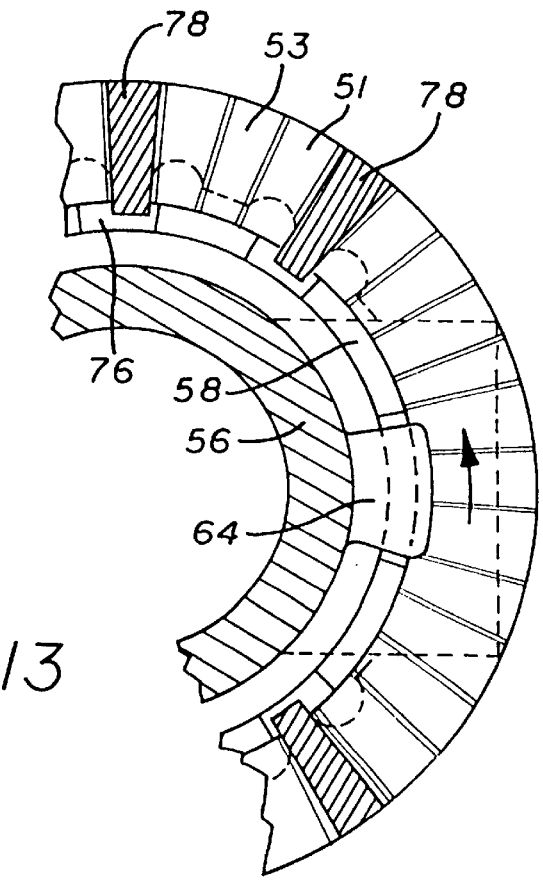
FIG. 13 illustrates the relative part positions after the teeth on the coupler and driver re-engage.

Now assume that the vehicle, still being powered, comes out of the first curve and enters a curve in the opposite direction. In this case because of the change in relative speed, the coupler 50 begins to rotate in the counter-clockwise direction with respect to the driver 52, as illustrated in FIG. 12, initially taking synchro ring 58 therewith. In the first part of the rotation, the extended teeth on driver 52 will align with the slots 76 in the synchro ring 58. When, in this condition, the teeth on the coupler and driver align for engagement, the springs 36 (FIG. 3a) force the driver teeth into engagement with the coupler teeth after which time pin 34 will rotate to engage the saddle-shaped depressions 70 in driver 52 to begin driving that axle, now the more slowly rotating axle. The final position of the components of the driving wheel is illustrated in FIG. 13.

When returning to driving straight after a turn, the position of the parts relative to each other will depend upon whether, and to what extent, the driver teeth aligned with the coupler teeth for engagement. Ultimately due to variations in terrain and slight course corrections along a straight path, the previously disengaged driver will become reengaged and transfer power from the pin to coupler or vice versa. In any event, because of the general symmetry of the parts, the operation will be as described, whether powering forward or in reverse around a curve, or using the engine for braking forward motion or rearward motion while going around the curve. Also, of course, when the wheel associated with the driver and coupler which are engaged at any given time begins to slip, the opposite driver and coupler, if not already engaged, will immediately engage, thereby providing the desired torque transferring differential action.

The chamfering of the teeth on the couplers 50 or drivers 52 or both provides a number of advantageous results, whether used in prior art locking differentials or as disclosed with respect to the preferred embodiment, the quiet positive acting differential described. In particular, as described herein, the angle of the root portion of the engagable teeth on the drivers 52 and couplers 50, as seen in FIG. 6, is chosen so that when a coupler is being driven by the pinion pin 34, the tendency for the teeth 53, 78 on the driver 52 to climb the teeth 51 on the coupler 50 is more than overcome by the force along the axis of the axles between the pin 34 and the respective driver 52, forcing the driver teeth 53, 78 to remain firmly engaged with the teeth 51 on the adjacent coupler 50. The angle of the chamfers, however, has just the opposite effect, namely, if only the outer region of the teeth on a driver and associated coupler are engaged, then even if pinion pin 34 is engaging the respective driver 52 and forcing the driver teeth 53, 78 into further rotation with respect to the coupler teeth 51, the angle of the chamfers will overcome whatever axial force is provided on the driver 52 by the pinion pin 34, forcing the driver back toward the pinion pin as the chamfered portion of the driver teeth 53, 78 easily climb the chamfered portion of the coupler teeth 51, ultimately allowing the tips of the driver teeth to slide over the tips of the coupler teeth. These effects are also obtained when only the driver teeth 53, 78 or only the coupler teeth 51 are chamfered, as previously discussed.

As described, particularly with respect to FIG. 5, the synchro ring 58 and the relief 60 in the coupler have an angled or conical engaging surface to positively axially locate the synchro rings 58 with respect to the couplers. Still, with respect to the operation of the differential described, the protrusions on a synchro ring generally only move under the extended teeth on the drivers when the tops of the teeth on the drivers begin to slide over the tops of the teeth on the couplers. Because of the accumulation of tolerances, the synchro rings may allow the respective drivers to move axially a very few thousandths of an inch into reengagement with the respective coupler teeth when the teeth on the drivers and couplers begin to realign. This, however, can easily be limited to within the axial range of motion for slight chamfer engagement only, causing the coupler to continue to rotate with respect to the respective driver with little axial motion of the driver as the teeth alternately very slightly engage and slide over each other until pinion pin 34 again begins to drive the respective driver 52 in the opposite direction, forcing the teeth on the driver into firm driving engagement with the teeth on the coupler when the same realign, as previously described. Thus, in the quiet positive acting differential described, the chamfered teeth not only further quiet the operation, but also prevent the inadvertent driving engagement of the mere tips of the teeth on the drivers and the couplers, thereby eliminating the possible over stressing of the teeth tips and the associated wear and deterioration, and noise associated therewith.

Thus in both the positive acting differential described herein and prior art locking differentials such as that illustrated in FIG. 1, the chamfered teeth provide the desirable effect of avoiding any possible driving engagement of tooth tips only, which could otherwise overstress the tooth tip area of both the drivers and couplers, resulting in accelerated wear or even local failure of the teeth tips. Such partial driving engagement of the teeth, followed by the teeth becoming disengaged as the drive force is increased, provides a shock to the entire drive train, and a most distracting noise to the vehicle driver. The chamfers, however, substantially eliminate this effect and assure that the teeth engage, for driving purposes at least, only on the lower portion of the teeth, where the teeth are thicker and have no unsupported adjacent outer edge.

Assembly of a positive acting differential according to the present invention will now be described with reference to FIGS. 2, 3a, and 4. The synchro rings 58 are assembled to the couplers 50 with drag clips 41. The couplers are installed through the opening in the differential case 54 and moved outwardly into receiving journal bearings in the differential case over the splined ends of the axles 20. One C clip 24 may be installed at this time, generally the C clip for the axle on the side of the differential case carrying the ring gear 80. In the exemplary differential shown in the figures, the ring gear is shown on the left and the left axle is shown as the first axle to receive a C clip. The second, right, axle remains unrestrained for assembly clearance.

The thrust slugs 82 have a thickness that provides the proper positional relationship between the inner ends of the axles 20 and the pinion pin 34. The diameter of the thrust slugs is approximately the same as the axles. Each thrust slug may be provided with a hole 83 to allow fluid communication of axle lubricants to and from the inner ends of the axles. The thrust slugs are inserted in a central bore in the spacers 56. An inner lip 57 may be provided at the inner end of the spacer bore to limit the inward travel of the thrust slug, facilitating assembly. Each thrust slug will typically rest against the inner lip initially, possibly held in position temporarily by grease.

In one embodiment, not shown, only one thrust slug is used on the side that will be last assembled. The spacer on the first assembled side includes an integral thrust surface.

The springs 36 are assembled to the drivers 52. The spacers 56 with the inserted thrust slugs 82 are inserted in the drivers with the spacer slots 85 aligned with the driver slots 84. The first, left, driver assembly is inserted into the differential case 54 adjacent to the restrained coupler. As shown, opposing flat surfaces may be provided to reduce the diameter of the drivers in one dimension to provide clearance for insertion of the driver. The first driver is pushed to the left and engaged with the teeth on the left coupler 50. Space in the case 54 is now highly limited. The right side driver, with the assembled spacer 56 and thrust slug 82 may be slid into position between the left side driver and the right side coupler 50 through the opening in the case by moving the right axle outwardly so that the inner end of the axle does not project past the face of the right coupler.

As shown in FIG. 2, the assembly including the two drivers 52 is then rotated 90° so that slot 84 in the right driver is accessible through the opening in the differential case 54. When the right side driver is in position, the right axle is moved inwardly past its final assembled position to align the groove on the end of the axle with the spacer slot 85 and the driver slot 84. The use of the loose thrust slug 82 allows the axle to have the necessary inward freedom. FIG. 4 illustrates the relative position of the parts at this stage of assembly. The C clip 24 is installed in the groove on the end of the axle through the spacer slot 85 and the driver slot 84. The axle is then moved outwardly to its final assembled position with the C clip retained in the axle groove by the spacer. The left side of FIG. 4 illustrates the first, left, spacer retaining the C clip for the left axle. It should be noted that the final position of the left thrust slug 82 is between the end of the left axle 20 and the notch 68 in the left spacer 56 and that the thrust slug has moved outwardly from the initial assembly position where the thrust slug was against the inner lip 57 of the spacer. The pinion pin 34 is then installed the bore in the differential case 54 and locked in position to complete the assembly. In the final assembly, the axles 20 are retained from outward movement by the C clips 24 and from inward movement by the ends of the axles contacting the thrust slugs 82 which, in turn, bear against the pinion pin 34. It will be appreciated that in some installations with more limited clearances an alternative assembly sequence that installs one or both C clips 24 through the slots 84, 85 may be preferred.

It should be noted that while the assembly of the pinion pin is the last step in the assembly process described, various other steps as described herein may be done in different order. By way of example, both C clips may be assembled after the couplers, the drivers, the slotted spacers, the thrust slugs, and the axles have been placed into the case. Thus, in the claims to follow, the various parts of the method may be practiced in a different order, so that no specific order limitation should be implied by the order set out in any of the claims.

In the specific embodiment shown, one or more holes 88, 89 are provided opposite the slots 84, 85. The hole or holes 89 in the spacer 56 are cooperatively disposed with respect to the hole or holes 88 in the driver 52. The holes allow the C clip 24 to be pressed off the axle 20 and through the slots for disassembly. In some applications, the C clip may be loosely engaged with the axle such that the C clip will fall through the slots when the slots are brought into appropriate alignment with the C clip. In such applications the holes are not required.

The slots 84 in the drivers 52 replace the recessed area 86 on the face of the drivers 30 of the prior art locking differential of FIG. 1. The recessed areas 86 in the prior art locking differential of FIG. 1 interrupt the continuity of the distribution of the teeth on the drivers, creating a lack of symmetry therein. The forces carried by the teeth on one side of the driver must be balanced by forces in the reduced number of teeth on the opposite side. Consequently, the load on the teeth of the drivers and couplers is not equally distributed among the teeth. This also creates a cocking force between the drivers and respective couplers which, particularly for partial teeth engagement, results in the plane of the drivers and couplers not remaining accurately parallel. Further, for any two engaging teeth, the load on the area of engagement of the teeth is not equally distributed over the engaging area. The net result of the asymmetry is faster tooth wear than necessary, and reduced resistance to abuse because of load concentrations. In the present invention, however, the symmetry in the engaging teeth eliminates any asymmetrical engagement forces and, in fact, itself provides aligning forces helping to maintain the drivers and respective couplers in alignment. The net result is a stronger assembly exhibiting reduced wear over the prior art design.

It should be noted that the slots 84, 85 (FIGS. 2, 3*a* and 4) are only needed in one of the drivers and spacers, namely, the last driver and spacer to be assembled, though for purposes of interchangeability and for reduction in the number of different parts needed to be assembled, it may be more convenient to provide the slot in both drivers and spacers. In either event, however, the use of slot 84 in one or both drivers can also result in increased strength of the positive acting differential. In particular, the use of slot 84 rather than recessed area 86 (FIG. 1) separates the position of insertion of the C clip 24 (FIG. 4) from the axial position of the teeth on the drivers and couplers. Thus the position of the teeth along the axis of the axles may be selected to maximize component strengths. More particularly, the couplers, being symmetrical and having symmetrical loads thereon, are inherently stronger than the drivers which have particularly concentrated loads at the sides of the saddles, which define localized thinner regions of the drivers. Accordingly, the slots 84 in a driver or drivers, as shown in FIG. 2, can frequently allow a reduction in the axial thickness of the couplers in favor of an increase in the axial thickness of the drivers, resulting in an overall stronger assembly.

There has been disclosed and described herein improved positive acting differentials which, like their predecessors, may be assembled into a differential case without removal of the case from the differential housing, and which provide all of the desired features of a positive acting differential while at the same time alleviating a distracting sound and adverse cycling characteristic associated with the prior art differentials discussed. The present invention allows selection of the driver and coupler thicknesses without being restricted by the possible positions of the C clip groove in the axles during assembly, and reduces wear in the driver and coupler teeth by eliminating a source of possible cocking between the engaging drivers and couplers. While the invention has been disclosed and described with respect to certain preferred embodiments thereof, it will be understood by those skilled in the art that various changes in form and detail may be made therein without departing from the spirit and scope of the invention.

What is claimed:

1. A differential assembly, comprising:

a case that has an inner cavity;

an outer ring gear attached to said case;

a coupler located within said inner cavity of said case;

an axle that is coupled to said coupler;

a driver that is coupled to said case and said coupler, said driver having a first slot that passes radially through one side of said driver;

a spacer that aligns said driver with said coupler, said spacer having a second slot that passes radially through one side of said spacer and is cooperatively aligned with the first slot;

a thrust slug that fits coaxially within the spacer and is moveable along the axis; and, a C clip that prevents said axle from being withdrawn from said coupler, said C clip being installed on said axle by being passed through said first and second slots.

2. The assembly as recited in claim 1, further comprising a pinion pin that couples said driver to said case and holds said thrust slug against the end of said axle.

3. The assembly as recited in claim 1, wherein the driver has a first hole that passes radially through the driver opposite the first slot, and the spacer has a second hole that passes radially through the spacer opposite the second slot and is cooperatively aligned with the first hole, for pushing the C clip from the axle.

4. The assembly as recited in claim 1, wherein said spacer retains said C clip on said axle and said thrust slug holds said axle in a position with said C clip held against said coupler.

5. The assembly as recited in claim 1, wherein said spacer further has a restriction to limit inward movement of the thrust slug.

6. A positive acting differential comprising:

first and second coaxial couplers for engaging first and second axles coaxial with the couplers, respectively;

a pinion pin between the couplers and having its axis substantially perpendicular to the axis of the couplers;

first and second drivers coaxial with and between the first coupler and the pinion pin, and the second coupler and the pinion pin, respectively;

first and second spacers coaxial with and between the first coupler and the first driver, and the second coupler and the second driver, respectively;

a first spacer coaxial with and rotatably fitting within the first driver between the first coupler and the pinion pin;

a second spacer coaxial with and rotatably fitting within the second driver between the second coupler and the pinion pin;

the first and second spacers maintaining axial alignment of the first coupler and the first driver, and the second coupler and the second driver, respectively;

the first and second couplers and the first and second drivers having cooperatively disposed axially engagable teeth distributed around their facingly disposed surfaces;

the first and second drivers each partially surrounding the pinion pin and being moveable along the axis of the axles between a first position wherein the teeth on one of the drivers and the adjacent coupler engage, and, unless restricted by engagement with the pinion pin, a second position wherein the teeth on one of the drivers and the adjacent coupler may slide over each other, the teeth on the couplers and the drivers being inclined so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin; and, the pinion pin, when driven in rotation about the axis of the drivers and couplers, engaging one or both drivers at a pinion pin to driver engagement angle or angles sufficient to overcome the tendency of the teeth on the respective driver to climb the teeth on the respective coupler when the teeth are engaged;

at least one of the drivers and at least one of the spacers having cooperative slots therein through the driver and spacer for assembly of an axle retaining C clip into a C clip receiving slot in the axle;

a first thrust slug restraining the first axle and a second thrust slug restraining the second axle from inward movement against the pinion pin.

7. The positive acting differential of claim 6 wherein at least one of the drivers and at least one of the spacers have cooperative holes opposite the slot therein through the driver and spacer for disassembly of the axle retaining C clip from the C clip receiving slot in the axle.

8. The positive acting differential of claim 6 wherein said first and second spacers each further have a restriction to limit inward movement of the thrust slug.

9. The positive acting differential of claim 6 wherein only one of the drivers has the slot therein through the driver for assembly of the axle retaining C clip into the C clip receiving slot in the axle.

10. The positive acting differential of claim 6 wherein both of the drivers have slots therein through the drivers for assembly of the axle retaining C clips into the C clip receiving slots in the axles.

11. The positive acting differential of claim 10 wherein both of the spacers have cooperative slots therein through the spacers for assembly of the axle retaining C clips into the C clip receiving slots in the axles.

12. The positive acting differential of claim 6 wherein the positive acting differential is assembled through an opening in a differential case.

13. The positive acting differential of claim 6, further comprising for each coupler, a ring structure forcibly rotatable relative to the respective coupler to first or second extreme positions relative to the pinion pin after the teeth on the respective driver have climbed the teeth on the respective coupler, the ring structure preventing re-engagement of the base regions of the teeth on the respective driver and coupler when in either of the first and the second extreme positions, and allowing engagement of the base regions of the teeth on the respective driver and coupler when the ring structure is not near either the first or the second extreme position.

14. The positive acting differential of claim 13 wherein each spacer rotatably fits within the respective driver for loosely coupling the pinion pin and the respective ring structure to cause the ring structure to rotate between the first and the second extreme positions relative to the pinion pin.

15. A positive acting differential comprising:

first and second coaxial axles; and, within a differential case, first and second coaxial couplers for engaging first and second axles coaxial with the couplers, respectively;

a pinion pin between the couplers and having its axis substantially perpendicular to the axis of the couplers;

first and second drivers coaxial with and between the first coupler and the pinion pin, and the second coupler and the pinion pin, respectively;

first and second spacers coaxial with and between the first coupler and the first driver, and the second coupler and the second driver, respectively;

a first spacer coaxial with and rotatably fitting within the first driver between the first coupler and the pinion pin;

a second spacer coaxial with and rotatably fitting within the second driver between the second coupler and the pinion pin;

the first and second spacers maintaining axial alignment of the first coupler and the first driver, and the second coupler and the second driver, respectively;

the first and second couplers and the first and second drivers having cooperatively disposed axially engagable teeth distributed around their facingly disposed surfaces;

the first and second drivers each partially surrounding the pinion pin and being moveable along the axis of the axles between a first position wherein the teeth on one of the drivers and the adjacent coupler engage, and, unless restricted by engagement with the pinion pin, a second position wherein the teeth on one of the drivers and the adjacent coupler may slide over each other, the teeth on the couplers and the drivers being inclined so that the driver teeth will climb the coupler teeth unless driver motion along the driver axis is restricted by driver engagement with the pinion pin;

the drivers being restrained in relative motion about their axis to an angle which is less than the angle of relative angular freedom between either driver and the pinion pin; and, the pinion pin, when driven in rotation about the axis of the drivers and couplers, engaging one or both drivers at a pinion pin to driver engagement angle or angles sufficient to overcome the tendency of the teeth on the respective driver to climb the teeth on the respective coupler when the teeth are engaged;

at least one of the drivers and at least one of the spacers having cooperative slots therein through the driver and spacer for assembly of an axle retaining C clip into a C clip receiving slot in the axle;

a first thrust slug restraining the first axle and a second thrust slug restraining the second axle from inward movement against the pinion pin.

16. The positive acting differential of claim 15 wherein at least one of the drivers and at least one of the spacers have cooperative holes opposite the slot therein through the driver and spacer for disassembly of the axle retaining C clip from the C clip receiving slot in the axle.

17. The positive acting differential of claim 15 wherein said first and second spacers each further have a restriction to limit inward movement of the thrust slug.

18. The positive acting differential of claim 15 wherein only one of the drivers has the slot therein through the driver for assembly of the axle retaining C clip into the C clip receiving slot in the axle.

19. The positive acting differential of claim 15 wherein both of the drivers have slots therein through the drivers for assembly of the axle retaining C clips into the C clip receiving slots in the axles.

20. The positive acting differential of claim 19 wherein both of the spacers have cooperative slots therein through the spacers for assembly of the axle retaining C clips into the C clip receiving slots in the axles.

21. The positive acting differential of claim 15 wherein the differential case is a one piece differential case and the positive acting differential is assembled within the differential case through an opening in the differential case.

22. The positive acting differential of claim 15, further comprising for each coupler, a ring structure forcibly rotatable relative to the respective coupler to first or second extreme positions relative to the pinion pin after the teeth on the respective driver have climbed the teeth on the respective coupler, the ring structure preventing re-engagement of the base regions of the teeth on the respective driver and coupler when in either of the first and the second extreme positions, and allowing engagement of the base regions of the teeth on the respective driver and coupler when the ring structure is not near either the first or the second extreme position.

23. The positive acting differential of claim 22 wherein each spacer rotatably fits within the respective driver for loosely coupling the pinion pin and the respective ring structure to cause the ring structure to rotate between the first and the second extreme positions relative to the pinion pin.

24. A method for assembling a positive acting differential, comprising:

inserting a first coupler into a first side of a differential case;

inserting a second coupler into a second side of the differential case, opposite the first coupler;

coupling the first coupler to a first axle;

installing a first C clip in a first groove on the first axle adjacent to the first coupler;

inserting a first thrust slug into a first spacer;

inserting the first spacer into a first driver;

inserting the first driver with the first spacer and the first thrust slug into the differential case adjacent to the first coupler;

inserting a second thrust slug into a second spacer having a spacer slot, said second thrust slug inserted to a position inward of said spacer slot;

inserting the second spacer into a second driver having a driver slot;

aligning the spacer slot to the driver slot;

inserting the second driver with the second spacer and the second thrust slug into the differential case adjacent to the second coupler;

coupling the second coupler to a second axle;

aligning a second groove on the second axle with the spacer slot and the driver slot;

installing a second C clip in the second groove;

moving the second axle outwardly to seat the second C clip.

25. The method as recited in claim 24, further comprising moving the first and second thrust slugs outwardly to a position adjacent the ends of the respective axles and installing a pinion pin into the differential case between the first driver and the second driver, between the first spacer and the second spacer, and between the first thrust slug and the second thrust slug.

26. A method for assembling a positive acting differential, comprising:

inserting a first coupler into a first side of a differential case;

coupling the first coupler to a first axle;

inserting a second coupler into a second side of the differential case, opposite the first coupler;

coupling the second coupler to a second axle;

inserting a first spacer having a first spacer slot into a first driver having a first driver slot;

inserting a first thrust slug into the first spacer inwardly from the first spacer slot;

aligning the first spacer slot to the first driver slot;

inserting the first driver with the first spacer and the first thrust slug into the differential case adjacent to the first coupler;

inserting a second spacer having a second spacer slot into a second driver having a second driver slot;

inserting a second thrust slug into the second spacer inwardly from the second spacer slot;

aligning the second spacer slot to the second driver slot;

inserting the second driver with the second spacer and the second thrust slug into the differential case adjacent to the second coupler;

aligning a first groove on the first axle with the first spacer slot and the first driver slot;

installing a first C clip in the first groove;

moving the first axle outwardly to seat the first C clip;

aligning a second groove on the second axle with the second spacer slot and the second driver slot;

installing a second C clip in the second groove;

moving the second axle outwardly to seat the second C clip.

27. The method as recited in claim 26, further comprising moving the first and second thrust slugs outwardly to a position adjacent the ends of the respective axles and installing a pinion pin into the differential case between the first driver and the second driver, between the first spacer and the second spacer, and between the first thrust slug and the second thrust slug.

* * * * *